United States Patent
Anderson et al.

(10) Patent No.: US 10,241,986 B2
(45) Date of Patent: *Mar. 26, 2019

(54) COMBINED SYNCHRONOUS AND ASYNCHRONOUS TAG DEPLOYMENT

(71) Applicant: Tealium Inc., San Diego, CA (US)

(72) Inventors: Michael Anderson, Carlsbad, CA (US);
Tyron Gavin, San Diego, CA (US);
Colin Douglas Sulin, Ramona, CA (US); Fiann James Curry-Towneley-O'Hagan, Godney (GB); Kevin Thomas Faurholt, Prague (CZ); Adrian Leslie Browning, Thatcham (GB)

(73) Assignee: TEALIUM INC., San Diego, CA (US)

( * ) Notice: Subject to any disclaimer, the term of this patent is extended or adjusted under 35 U.S.C. 154(b) by 580 days.

This patent is subject to a terminal disclaimer.

(21) Appl. No.: 14/556,545

(22) Filed: Dec. 1, 2014

(65) Prior Publication Data
US 2015/0212992 A1 Jul. 30, 2015

Related U.S. Application Data

(63) Continuation of application No. 14/151,700, filed on Jan. 9, 2014, now Pat. No. 8,904,278.

(Continued)

(51) Int. Cl.
*G06F 17/22* (2006.01)
*G06F 16/958* (2019.01)
*G06Q 30/02* (2012.01)

(52) U.S. Cl.
CPC ........ *G06F 17/2288* (2013.01); *G06F 16/958* (2019.01); *G06Q 30/0201* (2013.01)

(58) Field of Classification Search
CPC .... G06F 17/211; G06F 17/227; G06F 17/248; G06F 17/2247; G06F 17/30861;
(Continued)

(56) References Cited

U.S. PATENT DOCUMENTS

| | | | |
|---|---|---|---|
| 6,067,565 A | 5/2000 | Horvitz | |
| 6,553,393 B1 | 4/2003 | Eilbott | |

(Continued)

FOREIGN PATENT DOCUMENTS

| | | |
|---|---|---|
| CN | 102693501 A | 9/2012 |
| WO | WO 2009/009109 | 1/2009 |
| WO | WO 2011/128924 | 10/2011 |
| WO | WO 2013/003302 | 1/2013 |

OTHER PUBLICATIONS

MSDN, "Event Handling in HTML Elements Sample", published: Dec. 18, 2010, pp. 1-5.*

(Continued)

*Primary Examiner* — Wilson W Tsui
(74) *Attorney, Agent, or Firm* — Knobbe, Martens, Olson & Bear LLP

(57) ABSTRACT

A tag management system can implement a combined synchronous and asynchronous tag-loading scheme. In an embodiment of this scheme, a synchronous tag may be included at the top of or near the top of a content page. This synchronous tag can hide one or more page elements that are to be modified by a subsequent asynchronous personalization tag. Subsequently, the asynchronous personalization tag can update the page element and then cause the page element to be displayed. As a result, flicker between the old and new page elements can be reduced or avoided.

23 Claims, 13 Drawing Sheets

Related U.S. Application Data

(60) Provisional application No. 61/872,530, filed on Aug. 30, 2013, provisional application No. 61/889,876, filed on Oct. 11, 2013, provisional application No. 61/900,274, filed on Nov. 5, 2013, provisional application No. 61/896,351, filed on Oct. 28, 2013.

(58) Field of Classification Search
CPC ......... G06F 17/30899; G06F 17/30896; G06F 17/30994; G06F 17/0201; G06F 17/2288; G06F 17/3089
See application file for complete search history.

(56) References Cited

U.S. PATENT DOCUMENTS

| | | | |
|---|---|---|---|
| 6,553,461 B1 | 4/2003 | Gupta | |
| 6,836,799 B1 | 12/2004 | Philyaw et al. | |
| 7,117,429 B2* | 10/2006 | Vedullapalli | G06F 17/211 715/235 |
| 7,669,183 B2* | 2/2010 | Bowman | G06F 17/30896 715/744 |
| 7,685,168 B2 | 3/2010 | Koinuma et al. | |
| 7,685,200 B2 | 3/2010 | Gunawardena et al. | |
| 7,805,670 B2 | 9/2010 | Lipton et al. | |
| 7,823,059 B2 | 10/2010 | Hodgkinson | |
| 7,890,461 B2 | 2/2011 | Oeda et al. | |
| 7,908,336 B2 | 3/2011 | Carlson et al. | |
| 7,992,135 B1 | 8/2011 | Wong et al. | |
| 8,010,890 B2 | 8/2011 | Gumz et al. | |
| 8,019,777 B2 | 9/2011 | Hauser | |
| 8,131,861 B2 | 3/2012 | Butler et al. | |
| 8,185,610 B2* | 5/2012 | Goff | G06F 9/54 709/219 |
| 8,316,188 B2 | 11/2012 | Kadambi et al. | |
| 8,375,319 B2 | 2/2013 | Decker et al. | |
| 8,407,321 B2 | 3/2013 | Mickens et al. | |
| 8,413,046 B1* | 4/2013 | Mocanu | G06F 17/30905 715/200 |
| 8,429,243 B1 | 4/2013 | Wang et al. | |
| 8,539,345 B2* | 9/2013 | Appleyard | G06F 17/30873 715/234 |
| 8,560,610 B2 | 10/2013 | Lunt et al. | |
| 8,566,696 B1 | 10/2013 | Hamon | |
| 8,682,964 B1* | 3/2014 | Brundage | H04L 67/02 709/203 |
| 8,744,988 B1 | 6/2014 | Hamon | |
| 8,805,946 B1 | 8/2014 | Glommen et al. | |
| 8,843,827 B2 | 9/2014 | Koo et al. | |
| 8,904,278 B1 | 12/2014 | Anderson et al. | |
| 8,990,298 B1 | 3/2015 | Anderson | |
| 9,021,352 B2 | 4/2015 | Goel | |
| 9,081,789 B2 | 7/2015 | Anderson | |
| 9,116,608 B2 | 8/2015 | Koo et al. | |
| 9,165,308 B2 | 10/2015 | Cook | |
| 9,288,256 B2 | 3/2016 | Goodwin | |
| 9,412,115 B2 | 8/2016 | Seolas | |
| 9,503,499 B1* | 11/2016 | Donaldson | H04L 67/02 |
| 2001/0042171 A1 | 11/2001 | Vermeulen | |
| 2002/0078147 A1 | 6/2002 | Bouthors et al. | |
| 2002/0083167 A1 | 6/2002 | Costigan et al. | |
| 2003/0001888 A1 | 1/2003 | Power | |
| 2003/0184452 A1 | 10/2003 | Goodgoll | |
| 2004/0003130 A1 | 1/2004 | Becker | |
| 2004/0054784 A1 | 3/2004 | Busch et al. | |
| 2004/0083259 A1 | 4/2004 | Tenembaum | |
| 2004/0123044 A1 | 6/2004 | Franaszek | |
| 2004/0243939 A1 | 12/2004 | Perepa | |
| 2005/0125289 A1 | 6/2005 | Beyda et al. | |
| 2005/0125290 A1 | 6/2005 | Beyda et al. | |
| 2005/0138143 A1 | 6/2005 | Thompson | |
| 2005/0154781 A1 | 7/2005 | Carlson et al. | |
| 2005/0165643 A1 | 7/2005 | Wilson et al. | |
| 2006/0031778 A1 | 2/2006 | Goodwin et al. | |
| 2006/0195779 A1* | 8/2006 | McElroy | G06F 17/2247 715/204 |
| 2006/0218223 A1* | 9/2006 | Uchida | G06F 17/30899 709/201 |
| 2006/0271669 A1 | 11/2006 | Bouguenon et al. | |
| 2006/0277198 A1 | 12/2006 | Error | |
| 2007/0250618 A1 | 10/2007 | Hammond | |
| 2008/0046562 A1 | 2/2008 | Butler | |
| 2008/0077561 A1 | 3/2008 | Yomtobian | |
| 2008/0228578 A1 | 9/2008 | Mashinsky | |
| 2008/0244051 A1 | 10/2008 | Morris | |
| 2009/0006945 A1 | 1/2009 | Gumz et al. | |
| 2009/0228774 A1 | 9/2009 | Matheny | |
| 2009/0248494 A1 | 10/2009 | Hueter et al. | |
| 2009/0293001 A1 | 11/2009 | Lu et al. | |
| 2010/0066688 A1* | 3/2010 | Jeon | G06F 3/017 345/173 |
| 2010/0179967 A1 | 7/2010 | Zhang et al. | |
| 2010/0228850 A1 | 9/2010 | Fomitchev | |
| 2010/0251128 A1 | 9/2010 | Cordasco | |
| 2010/0281008 A1 | 11/2010 | Braunwarth | |
| 2010/0281178 A1 | 11/2010 | Sullivan | |
| 2010/0318976 A1 | 12/2010 | Everly et al. | |
| 2011/0015981 A1 | 1/2011 | Subramanian | |
| 2011/0055314 A1 | 3/2011 | Rosenstein et al. | |
| 2011/0055710 A1 | 3/2011 | Kirkby et al. | |
| 2011/0082858 A1 | 4/2011 | Yu et al. | |
| 2011/0093461 A1 | 4/2011 | Mui et al. | |
| 2011/0119374 A1 | 5/2011 | Ruhl et al. | |
| 2011/0153422 A1 | 6/2011 | Cousins | |
| 2011/0153796 A1 | 6/2011 | Branson | |
| 2011/0167391 A1 | 7/2011 | Momeyer et al. | |
| 2011/0185016 A1 | 7/2011 | Kandasamy et al. | |
| 2011/0219115 A1 | 9/2011 | Capel et al. | |
| 2011/0246879 A1 | 10/2011 | White et al. | |
| 2011/0282739 A1 | 11/2011 | Mashinsky et al. | |
| 2011/0296322 A1 | 12/2011 | Dhanjal et al. | |
| 2011/0302306 A1 | 12/2011 | Hanson et al. | |
| 2011/0314092 A1 | 12/2011 | Lunt et al. | |
| 2012/0005257 A1 | 1/2012 | Narayanana et al. | |
| 2012/0016836 A1 | 1/2012 | Fender et al. | |
| 2012/0054596 A1 | 3/2012 | Kroger et al. | |
| 2012/0066289 A1* | 3/2012 | Bland | G06F 21/10 709/203 |
| 2012/0096013 A1 | 4/2012 | Ciancutti | |
| 2012/0124131 A1 | 5/2012 | Muret et al. | |
| 2012/0154292 A1 | 6/2012 | Zhao et al. | |
| 2012/0169624 A1 | 7/2012 | Garn et al. | |
| 2012/0221411 A1 | 8/2012 | Graham, Jr. | |
| 2013/0055104 A1 | 2/2013 | Everingham | |
| 2013/0073401 A1 | 3/2013 | Cook | |
| 2013/0086484 A1 | 4/2013 | Antin et al. | |
| 2013/0091025 A1 | 4/2013 | Farahat et al. | |
| 2013/0110818 A1 | 5/2013 | O'brien-Strain | |
| 2013/0124332 A1 | 5/2013 | Doughty et al. | |
| 2013/0191208 A1 | 7/2013 | Chourey et al. | |
| 2013/0254897 A1 | 9/2013 | Reedy | |
| 2013/0282898 A1 | 10/2013 | Kalus et al. | |
| 2013/0290480 A1 | 10/2013 | Manion et al. | |
| 2013/0332604 A1 | 12/2013 | Seth et al. | |
| 2014/0013203 A1 | 1/2014 | Rogoveanu | |
| 2014/0081981 A1 | 3/2014 | Morris | |
| 2014/0089330 A1 | 3/2014 | Cui | |
| 2014/0215050 A1 | 7/2014 | Lu | |
| 2014/0304389 A1 | 10/2014 | Reavis | |
| 2014/0379840 A1 | 12/2014 | Dao et al. | |
| 2015/0066587 A1 | 3/2015 | Glommen et al. | |
| 2015/0127720 A1 | 5/2015 | Glommen et al. | |
| 2015/0169784 A1 | 6/2015 | Anderson | |
| 2015/0200994 A1 | 7/2015 | Jain et al. | |
| 2016/0004673 A1 | 1/2016 | Cook | |
| 2016/0026720 A1 | 1/2016 | Lehrer et al. | |

OTHER PUBLICATIONS

David Flanagan, "JavaScript: The Definitive Guide", published: 2002, p. 185.*
"Does the <script> tag position in HTML affects performance of the webpage?", Published: Apr. 24, 2013, pp. 1-7.*

(56) References Cited

OTHER PUBLICATIONS

International Search Report and Written Opinion issued in International Application No. PCT/US2014/052774 dated Dec. 29, 2014, in 23 pages.
International Search Report and Written Opinion issued in International Application No. PCT/US2014/052766 dated Dec. 8, 2014, in 11 pages.
International Search Report and Written Opinion issued in International Application No. PCT/US2014/063927 dated Jan. 29, 2015, in 11 pages.
U.S. Appl. No. 14/149,717, filed Jan. 7, 2014, Glommen, et al.
U.S. Appl. No. 14/159,062, filed Jan. 20, 2014, Koo, et al.
U.S. Appl. No. 14/216,801, filed Mar. 17, 2014, Glommen.
"Preload CSS/JavaScript without execution," http://www.phpied.com/preload-cssjavascript-without-execution, Apr. 21, 2010, in 14 pages.
"What are the ways to load JavaScript or CSS without executing them?" http://stackoverflow.com/questions/8843132/what-are-the-ways-to-load-javascript-or-css-without-executing-them, Jan. 12, 2012, in 4 pages.
"Separating JavaScript Download and Execution," http://www.nczonline.net/blog/2011/02/14/separating-javascript-download-and-execution, Feb. 14, 2014, in 7 pages.
EVisit Analyst 8 Features, http://www.evisitanalyst.com/eva8, retrieved on Feb. 10, 2014, in 6 pages.
Access your campaign report in Google Analytics, http://help.campaignmonitor.com/topic.aspx?t=112, retrieved on Feb. 10, 2014, in 5 pages.
"Boosting Marketing Agility with Enterprise Tag & Data Management", Ensighten, dated Jun. 2013, in 14 pages.
Adobe Analytics/Tag management, http://www.adobe.com/in/solutions/digital-analytics/tag-management.html, retrieved on Feb. 10, 2014, in 1 page.
Improving Testing & Optimization Through Tag Management—Key Factors to Consider When Choosing the Right Tag Management Solution, Tealium, dated Sep. 2013, in 12 pages.
West, "Tag management Systems: How do I choose?" Demystified, Jul. 29, 2013, in 5 pages.

"TagMan and Digital Fulcrum Join Forces to Optimize Performance of Legacy 3rd Party Tags", http://www.tagman.com/tagman-and-digital-fulcrum-join-forces-to-optimize-performance-of-legacy-3rd-party-tags/ New York, NY, dated Feb. 9, 2012, in 3 pages.
"Site Tagging Best Practices Version 1.0 Draft Public Comment", iab (Interactive Advertising Bureau), dated Nov. 29, 2012, in 18 pages.
Behnam, Ali, "Taking Your Test Platform to the Next Level", http://tealium.com/blog/digital-marketing/taking-your-test-platform-to-the-next-level/ retrieved Jan. 12, 2014, in 10 pages.
Handwrite on mobile, Google, https://support.google.com/websearch/answer/2649515?p=sbw_tips&hl=en&rd=2, retrieved Jan. 12, 2014, in 3 pages.
International Search Report and Written Opinion issued in Application No. PCT/US2014/012217 dated May 21, 2014.
"Features—Segment, Features to Explore," screenshot of website retrieved from <http://www.segment.com/tour/features> on Nov. 4, 2015, 4 pages.
Floodlight Tag Format—DFA Partner Help, https://support.google.com/dfa/partner/answer/154049, accessed on Apr. 13, 2016, in 5 pages.
Google, Google Tag Manager: iOS v3—Getting Started, https://developers.google.com/tagmanager/ios/v3/, retrieved on Sep. 8, 2017, from the Sep. 15, 2014 wayback machine capture (https://web.archive.org/web/20140915200723/https://developers.google.com/tag-manager/ios/v3/) (13 pages).
"Integrations for every team," screenshot of website retrieved from <http://www.segment.com/home> on Nov. 4, 2015, 1 page.
"Segment—We make customer data simple," screenshot of website retrieved from <http://www.segment.com/home> on Nov. 4, 2015, 4 pages.
Padolsey, James, "Avoiding DOM Flickering", published: Jul. 23, 2009, pp. 1-6, http://james.padolsey.com/javascript/avoiding-dom-flickering/.
Website: 'TheScarms', "ASP.net V2.0 Client-Side JavaScript Callbacks (AJAX)", published: Jul. 18, 2007, pp. 1-4, https://web.archive.org/web/20070718054551/http://www.thescarms.com/dotnet/ajax.aspx.

* cited by examiner

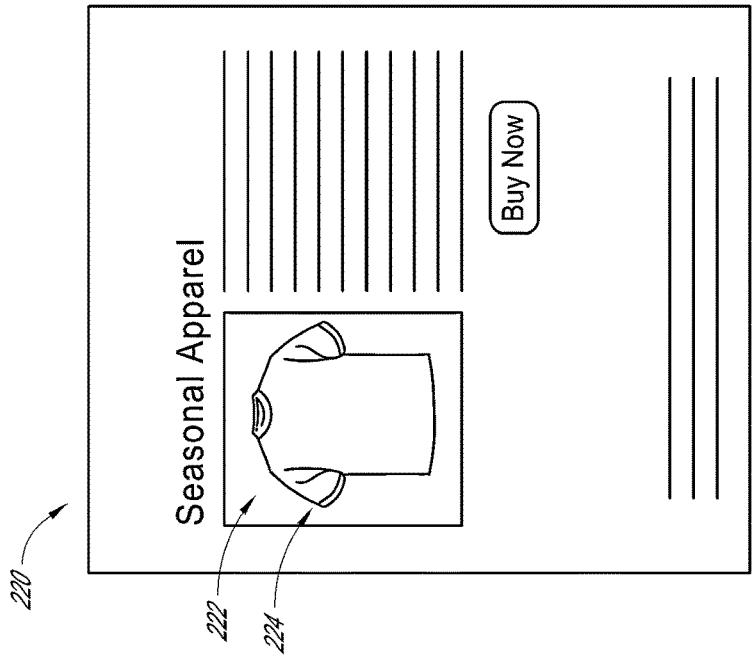
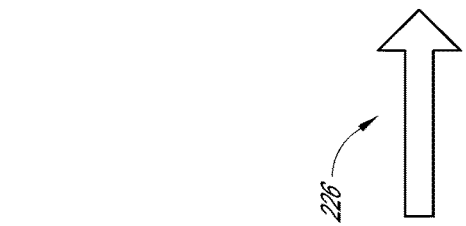
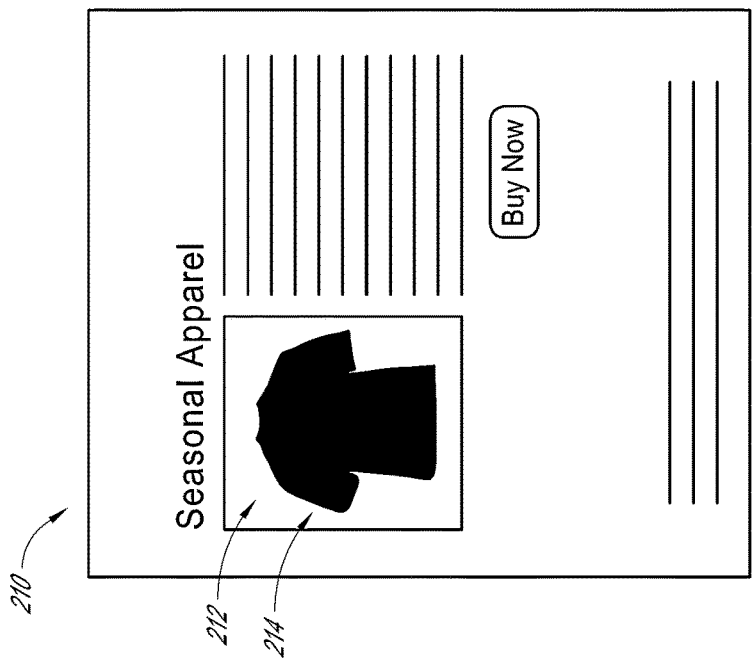
FIG. 2A
(PRIOR ART)

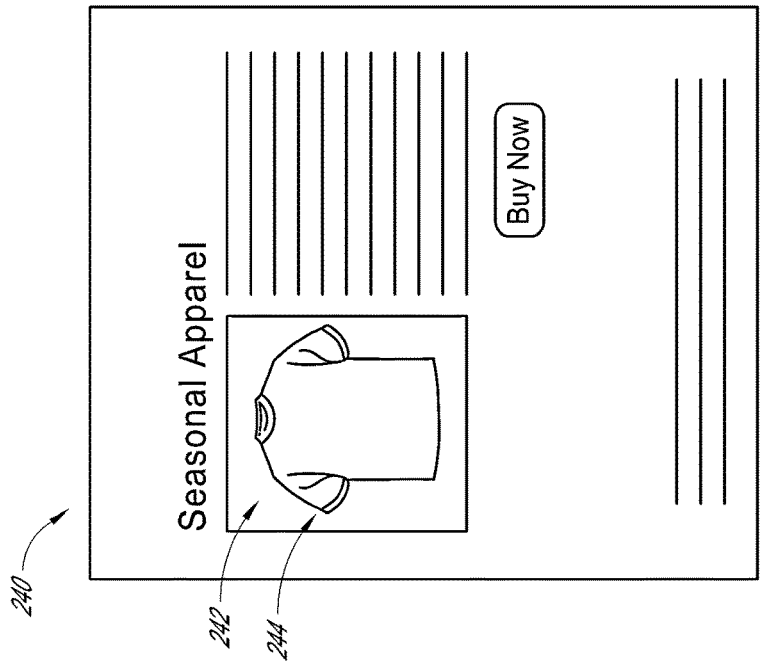
NO FLICKER EXAMPLE
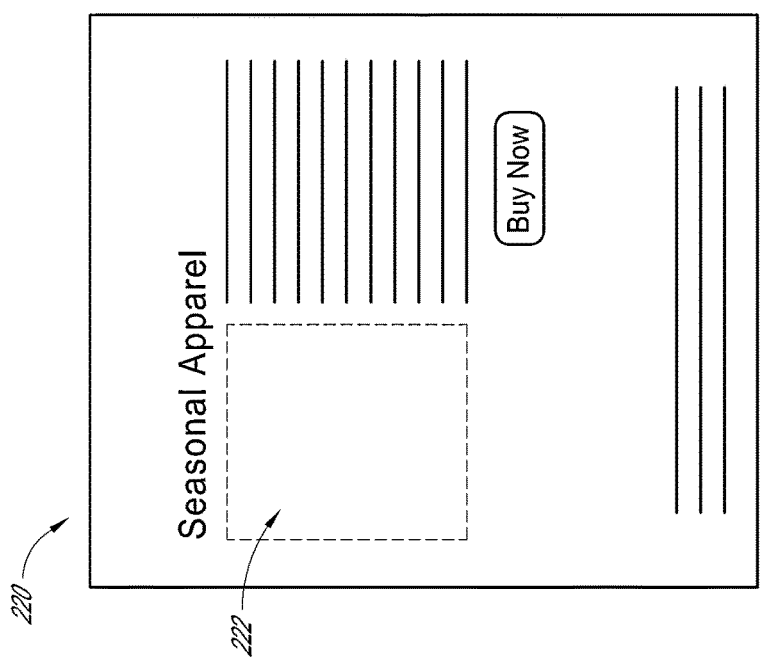
FIG. 2B

Example Content Page File

```
<html>                                          ← 1011
<head>
<title>Sample Content Page</title>
</head>
<body>
<script
  type="text/javascript" src='//tags.tiqcdn.com/utag/tealium/main/prod/utag.sync.js'>  ← 1010
</script>
<p> .... </p>                                   ← 1012
<script type="text/javascript">
  var utag_data = {}
</script>
<!-- Loading script asynchronously -->
<script type="text/javascript">                 ← 1020
  (function(a,b,c,d){
  a='//tags.tiqcdn.com/utag/tealium/main/prod/utag.js';
  b=document;c='script';d=b.createElement(c);d.src=a;d.type='text/java'+c;d.async=true;
  a=b.getElementsByTagName(c)[0];a.parentNode.insertBefore(d,a);
  })();
</script>
<p> .... </p>                                   ← 1014
</body>
</html>
© 2013 Tealium.com Inc.
```

FIG. 10

```
Example Synchronous Script
(function(bff,i)
{
    bff={
        dl:["blackDiv","blueDiv","pinkDiv","redDiv"],  ← 1120
        bn:function(n,s,d,h,t)
        {
            s=document.createElement('style');  ← 1110
            d='#'+n+'{visibility:hidden;}';
            s.setAttribute("type","text/css");
            s.setAttribute("id","uffs_"+n);
            h=document.getElementsByTagName('head')[0];
            h.appendChild(s);
            if(s.styleSheet)
                {s.styleSheet.cssText=d;}
            else
            {
                var t=document.createTextNode(d);
                s.appendChild(t);
            }
        }
    };
    for(i=0;i<bff.dl.length;i++)  ← 1130
    {
        bff.bn(bff.dl[i]);
    }
}());
© 2013 Tealium.com Inc.
```

FIG. 11

COMBINED SYNCHRONOUS AND ASYNCHRONOUS TAG DEPLOYMENT

RELATED APPLICATIONS

This application is a continuation of U.S. patent application Ser. No. 14/151,700, filed Jan. 9, 2014, entitled "COMBINED SYNCHRONOUS AND ASYNCHRONOUS TAG DEPLOYMENT," which claims priority under 35 U.S.C. § 119(e) as a nonprovisional application of the following U.S. Provisional Applications:

| App. No. | Filing Date | Title | Attorney Docket |
| --- | --- | --- | --- |
| 61/872,530 | Aug. 30, 2013 | CONTENT SITE VISITOR PROCESSING SYSTEM | TEALM.001PR |
| 61/889,876 | Oct. 11, 2013 | COMBINED SYNCHRONOUS AND ASYNCHRONOUS TAG DEPLOYMENT | TEALM.002PR |
| 61/900,274 | Nov. 05, 2013 | UNIVERSAL VISITOR IDENTIFICATION IN TAG MANAGEMENT SYSTEMS | TEALM.003PR |
| 61/896,351 | Oct. 28, 2013 | SYSTEM FOR PREFETCHING DIGITAL MARKETING TAGS | TEALM.004PR |

In addition, this application is related to U.S. application Ser. No. 14/149,717, filed Jan. 7, 2014, titled "Content Site Visitor Processing System." The disclosures of each of the foregoing applications are hereby incorporated by reference in their entirety. Further, any subset of the embodiments described herein can be implemented in combination with any subset of the embodiments described in the foregoing applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Some operators of content sites, such as websites, regularly obtain the results of analytics performed with regard to user interactions on their content sites. User analytics can include any type of data regarding interactions of end users with content sites, among other types of data. There are different approaches to gathering analytics data, one of which includes employing the use of digital marketing tags.

Digital marketing tags can include small pieces of website code that allow a website operator to measure traffic and visitor behavior, understand the impact of online advertising and social channels, use remarketing and audience targeting, or use personalization features to test and improve a content site, among optionally other functions. Adding tags to a content site has typically required involving a developer to manually insert tag code into one or more pages of a website.

SUMMARY

In certain embodiments, a method of avoiding flicker between old and new versions of a page element in a content page can include (under control of a physical computing device comprising digital logic circuitry) receiving a web page having a synchronous script and an asynchronous script, where the synchronous script is placed before the asynchronous script in the web page so as to facilitate execution of the synchronous script prior to the asynchronous script. The method can also include executing the synchronous script associated with the web page. The synchronous script can include at least one operation that can cause, other than by delayed loading of the synchronous script, a first version of a page element of the web page to be hidden during an initial display of the web page in a browser. The method can also include, subsequent to execution of the synchronous script, asynchronously executing an asynchronous script associated with the web page, where the asynchronous script can cause a second version of the page element to be rendered visible in the browser in place of the first version of the page element. The combined action of the synchronous script and the asynchronous script can prevent user-perceived flicker of first displaying the first version of the page element followed by displaying the second version of the page element.

In some embodiments, a system for avoiding flicker between old and new versions of a page element in a content page can include one or more memory devices that can store: a first script having a first command that can hide a first version of a page element of a content page responsive to rendering of the content page for display, and a second script having a second command that can cause a second version of the page element to be rendered visible in the display of the content page. The system can also include one or more hardware processors in communication with the one or more memory devices. The one or more hardware processors can include digital logic circuitry that can implement the first script synchronously and that can subsequently implement the second script.

Further, in some embodiments a system for avoiding flicker between old and new versions of a page element in a content page includes one or more memory devices configured to store: a first digital marketing tag having a first command that can hide a first version of a page element of a content page responsive to rendering of the content page for display, and a second digital marketing tag having a second command that can cause a second version of the page element to be rendered visible in the display of the content page. The system can also include one or more hardware processors in communication with the one or more memory devices. The one or more hardware processors can include digital logic circuitry that can implement the first digital marketing tag synchronously and that can subsequently implement the second digital marketing tag.

Moreover, in certain embodiments, a system for avoiding flicker between old and new versions of a page element in a content page can include a server system having physical computer hardware that can output a user interface that provides functionality for a user to specify a page element of a content page and to request a flicker-free update of the page element from a first version of the page element to a second version of the page element. The user interface can also provide a synchronous tag that can hide the first version of the page element in response to the request for the flicker-free update of the page element. The user interface can also provide an asynchronous tag that can enable showing of the second version of the page element in the content page.

In certain embodiments, the system of the preceding paragraph can be used in conjunction with any combination of the following features: the second version of the page element can be the same as the first version of the page element; the user interface further can include a plug-in user interface that provides functionality for the user to select the first version of the page element from the content page; the server system can also programmatically obtain a hypertext markup language (HTML) tag associated with the page element in response to user selection of the first version of the page element; the plug-in user interface can also provide functionality for the user to specify the second version of the page element; the server system can also output synchronous tag container code to the user for inclusion in the content page, where the synchronous tag container code includes a reference to the synchronous tag; the server system can provide the synchronous tag to a tag server that can serve the synchronous to an end user system in response to being called by the synchronous tag container code; and the server system can provide the synchronous tag to the user for direct inclusion in the content page.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

FIG. 2A depicts an example prior art content page loading scenario with flicker.

FIG. 2B depicts an example content page loading scenario without flicker.

FIG. 10 depicts an example content page file.

FIG. 11 depicts an example synchronous script that can facilitate avoiding flicker.

DETAILED DESCRIPTION

I. Tag Management Overview

Figure 1:
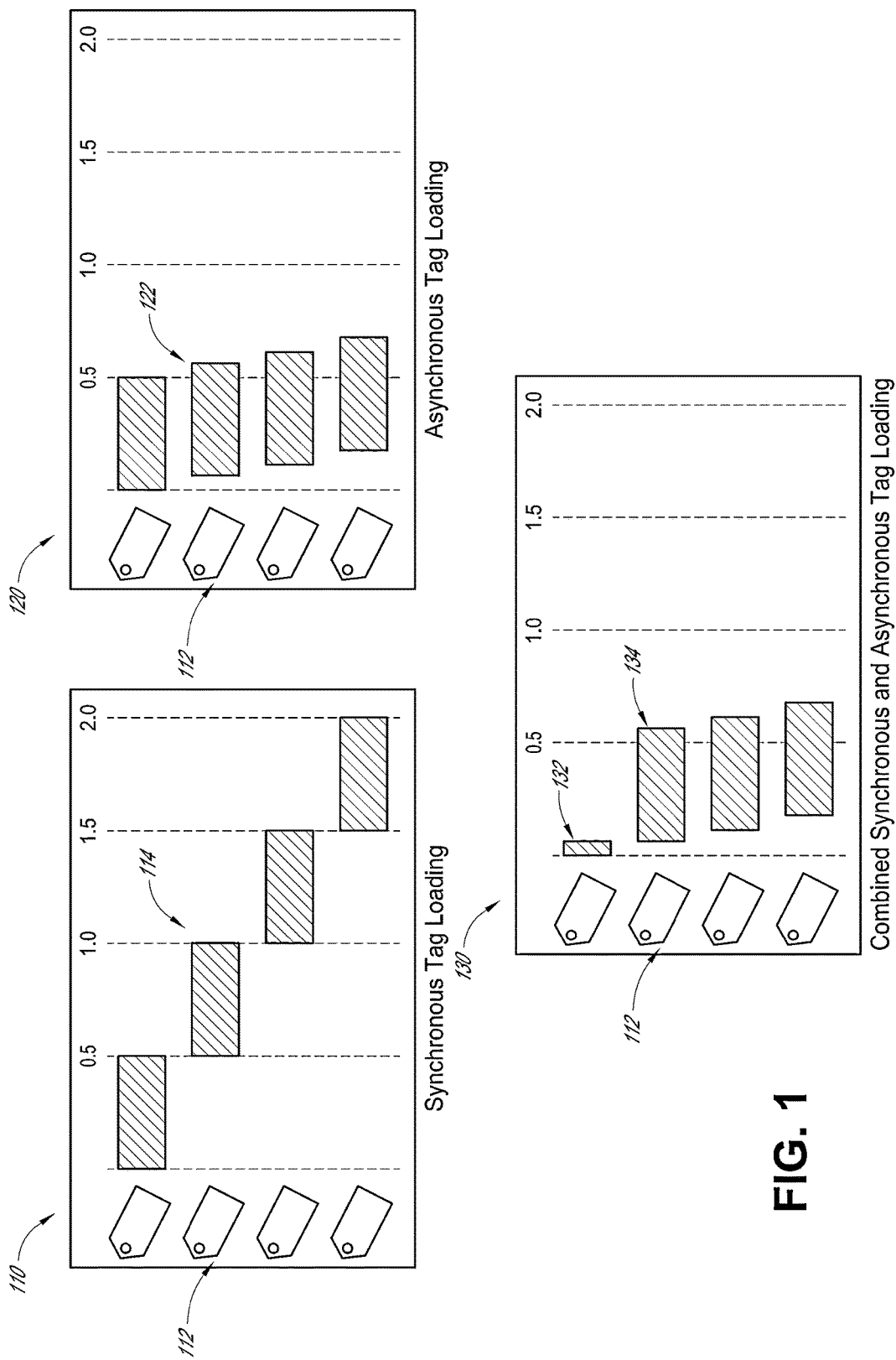
FIG. 1 depicts example tag loading scenarios.

Adding tags to web pages without efficient management can create significant problems and inconveniences. For instance, code associated with multiple tags can bog down a content site and can be a major performance drain. Redundant or incorrectly applied tags can also distort measurements and result in duplicate costs or missing data. Poor tag management can also be time consuming for the information technology (IT) department or webmaster team to add new tags, which may mean that important marketing and measurement programs might be significantly delayed.

Tag management systems have recently been introduced to improve the management of tags. In one embodiment, a tag management system can deploy a single tag or a tag container to a content site. Each page or any subset of pages in the content site can incorporate the tag container as a universal tag that can be used to gather any type of visitor data of a visitor to a content site. This tag container can be used to interface with any number of third party vendor tags without requiring, in certain embodiments, such tags to be coded expressly in the code of the content pages (such as web pages) of the content site. Thus, changes to the tagging of a content site may be made through a user interface provided by the tag management system without having to use a developer to add the tags to the content pages manually. As a result, the tag management system can be more accessible to marketing people without IT or programming knowledge.

This tag container approach to tag management can promote high scalability and provide marketing agility, enabling marketers and other marketing users to rapidly change data collected or analyzed by the tag management system. Further, since one tag container is embedded within the content pages in certain embodiments, the content pages may load faster and, therefore, include many performance improvements. Moreover, there may be reduction of IT costs provided by using the disclosed tag management system because IT personnel can shift away from performing marketing work to focusing on IT work. However, as will be seen below, it can be beneficial to include a second tag container to address other performance issues related to personalization for testing and improving a content site.

II. Personalization Overview

Testing and site improvement solutions have rapidly become staples of any major online marketing program. These solutions let marketing teams know which elements are working best in terms of improving site conversion rates. These teams work with marketing analytics and information technology (IT) departments to build programs that are designed to continuously test and maintain the highest conversion rates possible.

Testing and optimization solutions can work by changing and measuring the content on a site and determining which content works best. The change can be as involved as changing an entire page or as simple as changing a simple component of the page (such as an image, video, text, a price, etc.). Traffic may be split randomly between the various treatments, and the results can be measured to determine which content or treatment produces the best result. These solutions work because they take the guesswork out of site optimization and let organizations make changes to the content based on quantitative data.

While popular, site optimization can still be challenging. One of the primary challenges facing the practice is instrumenting the site with a testing vendor's tags. Tagging sites for optimization and testing tools tends to be far more involved than deploying other types of tags. Personalization solutions often place tags not only across a site, but in some cases, around the specific content that is to be tested. For example, with popular solutions, such as Adobe™ Test and Target, special HTML tags called "mboxes" are placed around the specific content being tested. As used herein, in addition to having their ordinary meaning, "HTML tags" can refer to HTML content denoted or referred to by angle brackets (< >) and should not be confused with digital marketing tags (often referred to herein simply as "tags"). However, digital marketing tags may include one or more HTML tags, scripts for generating HTML tags, or the like. Further, as used herein, HTML tags may also encompass the page content between opening tags (such as "<div>") and closing tags (such as "</div>"). HTML tags are often referred to herein as page elements. The term "page element," in addition to having its ordinary meaning, can also refer to the content between opening and closing HTML tags, the HTML tags themselves, or both the HTML tags and the enclosed content.

In certain embodiments, the tag management system described herein can provide optimization teams with the ability to easily add new personalization tags without further taxing IT teams.

III. Synchronous vs. Asynchronous Tag Loading

There are different ways to deploy tags to a content site. One method for deploying tags is to use synchronous loading of the tags. Synchronous tags load in a serial fashion. Consequently, when a synchronous tag starts loading, it blocks the rest of the page from loading. Once a synchronous tag loads, then the rest of the page can continue to load. This is analogous to a slow-moving truck on a one-lane road that will slow down the entire traffic behind it.

Synchronous loading and other tag loading techniques can be understood in the context of FIG. 1. FIG. 1 depicts three example tag loading graphs 110, 120, 130. The first graph 110 depicts a synchronous tag loading scenario, showing tags 112 on the Y axis and time on the X axis. Bars 114 represent the amount of time that each tag takes to load. For convenience, each tag 112 is shown to have an equal loading time of 0.5 seconds, although tags may actually take different times to load. As each tag 112 loads serially, the total time for the tags to load is cumulative (two seconds in this example). Thus, the graph 110 illustrates how synchronously or serially loading tags can slow down the loading of a website.

A more modern method for loading tags is to load tags asynchronously. In this method, tags are loaded in parallel or substantially in parallel with the rest of the page content. This can mean that even if the tag is slow to respond or to load, it may not slow down the rest of the site or tags from loading. Asynchronous tag-loading is demonstrated in FIG. 1 with respect to the graph 120. In the graph 120, tags 112 load substantially in parallel, and their load times are represented by bars 122. In contrast to the bars 114 in the synchronous tag-loading scenario, the bars 122 are overlapping, resulting in a total loading time that is often less than the total load time in the synchronous tag-loading scenario of the graph 110.

Although asynchronous loading may be useful or even preferred for most tags, it can present some challenges for testing tags in that it can potentially introduce flicker in the user experience if either the tag management system or the testing servers are slow to respond. Flicker can happen when the default content of a page loads, followed by test content in full view of the user. For example, as a page loads, the user may see a green button and a split second later see a red button replace the green button.

To illustrate, FIG. 2A depicts an example flicker scenario that can occur with asynchronous tag loading. To the left of FIG. 2A is an example content page 210 that represents an initial page that may be displayed prior to a personalization modification made by an asynchronous tag to the page. In the page 210, an image page element 212 is shown that depicts a black t-shirt 214. A digital marketer may wish to test a different color t-shirt on the page and thus may implement a personalization tag that depicts (for example) a white t-shirt as shown in a content page 220. The content page 220 depicts an image tag element 222 including the white t-shirt 224.

An arrow 226 between the content pages 210, 220 indicates that after the page 210 initially loads, an asynchronous tag can dynamically update the page 210 (e.g., without a full page reload) to depict the page 220 with the white t-shirt 224 replacing the black t-shirt 214. Since the asynchronous tag may load this personalized image 222 with a slight delay after the loading of the initial image 212, the change from the black t-shirt to the white t-shirt 224 may be perceived as flicker by the user.

Flicker may be harmless at times but at other times may annoy or confuse a user and may even drive users away, resulting in lost sales. For instance, prices may be particularly sensitive to flicker. If a lower price is first depicted and then a higher price is shown, this brief but noticeable change may upset a user and cause the user to leave the site.

A tag management system could solve the flicker problem by forcing all tags to be synchronous. However, doing so would typically slow the loading time of the tags, as shown in the graph 110. Instead, in certain embodiments, the tag management system described herein implements a combined synchronous and asynchronous tag-loading scheme, such as that depicted in graph 130 of FIG. 1. In an embodiment of this scheme, a synchronous tag may be included at the top of or near the top of a content page. This synchronous tag can hide one or more page elements that are to be modified by a subsequent asynchronous personalization tag. Subsequently, the asynchronous personalization tag can update the page element and then cause the page element to be displayed.

An example scenario depicting the results of this combined synchronous-asynchronous tag loading is shown in FIG. 2B. In this example scenario, a first page 220 is shown in which an image 222 (such as the black t-shirt of FIG. 2A) has been hidden by a synchronous tag. In addition, a second page 240 is shown that depicts an image 242 with a white t-shirt 244 that has been loaded and made visible by an asynchronous tag. In this scenario, flicker may not be perceived by the user between the old image 222 and the new image 242 because of the hiding of the image by the initial synchronous tag. The synchronous tag blocks the image from loading due to its synchronous nature, giving the synchronous tag time to modify the content page 220 to hide subsequent loading of the image 222. The asynchronous tag that makes the new image 242 visible can load with faster performance than a second synchronous tag that may have to wait on other page elements or other tags to load.

Referring again to FIG. 1, the performance of the combined synchronous and asynchronous tag loading scenario, as depicted in graph 130, may still be high relative at least to the synchronous tag-loading scenario in graph 110. The synchronous tag 113 can have a short loading time represented by bar 132, due to the synchronous tag having a lightweight function of merely rendering elements invisible or hidden in one embodiment. (In other embodiments, the synchronous tag may have other functions as well.) One or more asynchronous tags 134 load subsequent to the loading of the synchronous tag 132, with bars 134 representing their loading times, which may be performed in parallel or substantially in parallel. One of these asynchronous tags may be the personalization tag that renders the new image visible.

Advantageously, in certain embodiments, the combined use of a synchronous tag with an asynchronous tag or tags can provide an elegant solution for digital marketers to reduce flicker in their content pages without requiring a developer to become involved to reduce the flicker. Thus, for instance, the combined synchronous and asynchronous tags can replace scenarios where the developer is required to manually delete the first image from the page code so that it will not be displayed. Further, the combined synchronous/asynchronous loading can allow A/B testing and multivariate testing, whereas requiring the developer to delete the first image eliminates the ability to do such testing.

It should be understood that although flicker avoidance is one potential benefit of using combined synchronous and asynchronous tag loading, this combined loading scheme may have other benefits as well, some examples of which are described below. However, for convenience, this specification will primarily refer to the flicker-avoidance benefits of synchronous-asynchronous tag loading, without any loss of generality.

IV. Example Computing Environment for Synchronous-Asynchronous Loading

Figure 3:
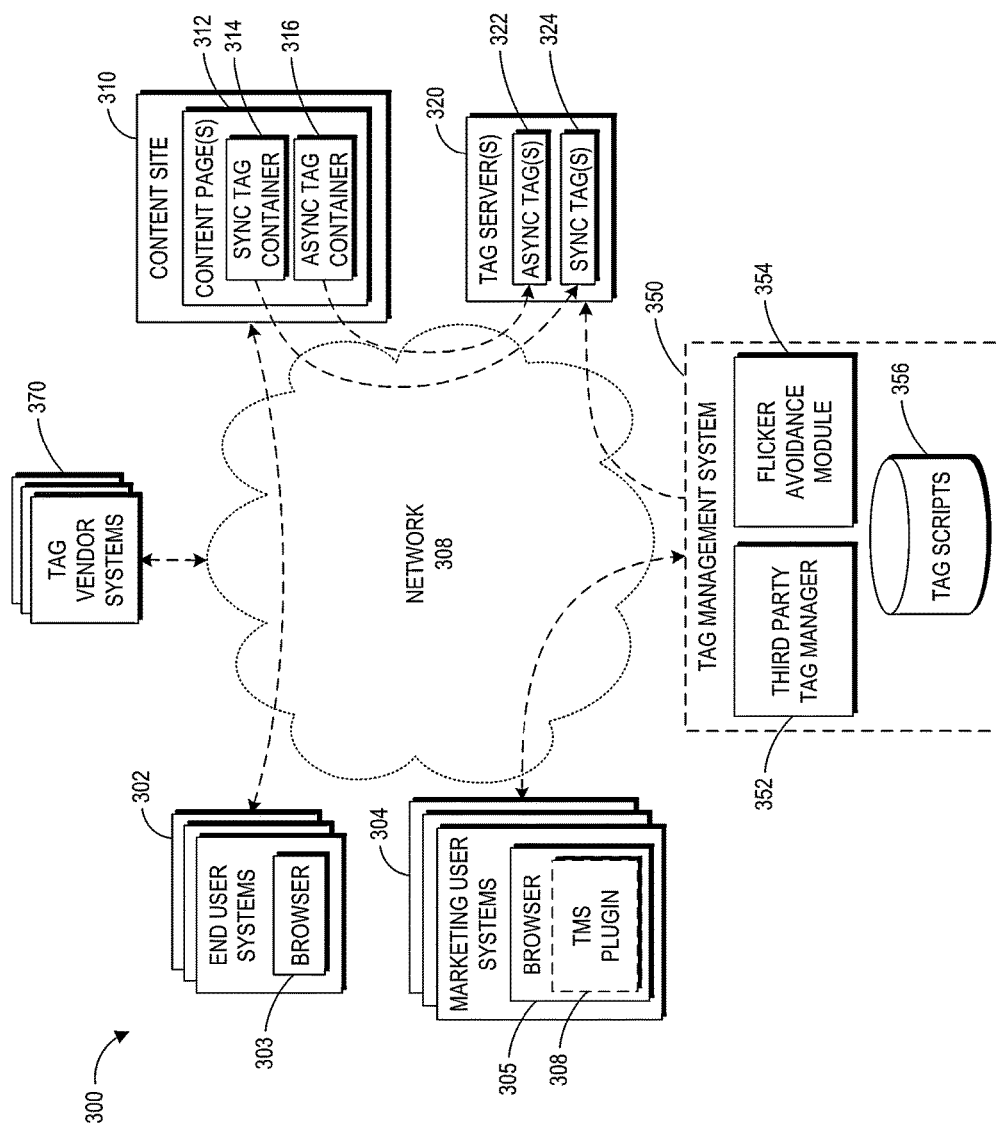
FIG. 3 depicts an embodiment of a computing environment that provides access to a tag management system that can facilitate flicker avoidance.

Synchronous-asynchronous tag loading features will now be described in the context of FIG. 3, which depicts an example computing environment 300 that provides access to a tag management system 350. The tag management system 350 can facilitate the creation of synchronous and asynchronous digital marketing tags that can reduce or eliminate flicker, among other benefits.

In the computing environment 300, one or more end user systems 302 communicate over a network 308 with a content site 310. The end user systems 302 can include any form of computing device and may be desktops, laptops, smartphones, tablets, or the like. A browser 303 or other application software installed in the end user systems 302 accesses one or more content pages 312 of the content site 310. The content pages 312 may be web pages or other documents or files that may be accessed remotely and provided to the end user systems 302. Accordingly, the content pages 312 may be web pages, documents (e.g., .pdf documents), videos, images, text, combinations of the same, or the like. The content site 310 may be a website, a web server, an application server, a database server, combinations of the same, or the like. Further, the network 308 can include a local area network (LAN), a wide area network (WAN), an organization's intranet, the public Internet, combinations of the same, or the like.

In the depicted embodiment, the content pages 312 include a synchronous tag container 314 and an asynchronous tag container 316. Both the synchronous tag container 314 and the asynchronous tag container 316 can be examples of digital marketing tags in certain embodiments. The synchronous tag container 314 can contain a reference to a synchronous tag 324 hosted on a tag server 320, which may include a physical and/or virtual computing system. Likewise, the asynchronous tag container 316 can include a reference to one or more asynchronous tags 322 hosted on the tag servers 320. The synchronous tag container 314 and synchronous tag(s) 324 may be used when a marketing user requests flicker avoidance with respect to a personalization tag or other type of tag associated with the content page 312.

The synchronous tag container 314 may be responsible for invoking a synchronous tag 324 to cause a page element to be hidden in the content page 312, whereas the asynchronous tag container 316 can invoke one or more asynchronous tags 322 to output a new version of the hidden page element and render that page element visible. In addition, the asynchronous tag container 316 may reference many other asynchronous tags 322 that do not relate to personalization (examples of which are described below) or other types of personalization tags that do not use the flicker avoidance features of the tag management system 350.

The tag management system 350 can be implemented in computer hardware and/or software, such as one or more physical or virtual servers, which may be geographically distributed or co-located. In the depicted embodiment, the tag management system 350 includes a third-party tag manager 352, a flicker avoidance module 354, and a data repository 356 for storing tag scripts to be published to the tag servers 320. The third-party tag manager 352 can provide functionality for a marketing user to associate any of a variety of third-party tags with the content page 312 or other native tags of the tag management system 350 including, for example, the visitor tag described in U.S. Application No. 61/872,530 filed Aug. 30, 2013, entitled "Content Site Visitor Processing System," a copy of which is incorporated in the attached Appendix, which is incorporated as if set forth fully herein.

In an embodiment, the third-party tag manager 352 can output a user interface that enables marketing users of the marketing users system 304 to select tags from different tag vendors (including personalization tags), enter account details and other information specific to those tags, specify which content pages 312 they want the tags to load on, and click a "publish" button or the like to add the tags to the content pages 312. Once a user has published a tag through the third-party tag manager 352, the third-party tag manager 352 can upload the tag to one or more of the tag servers 320 as an asynchronous tag 322.

For instance, the tag management system 350 can provide functionality for marketing users to select which third party vendor tags 316 to associate with the tag container 314 for a variety of vendor-specific processing purposes. These purposes can include obtaining analytics for data analysis or business intelligence, tracking affiliate activity with respect to the content site 310, obtaining user data for displaying targeted ads, obtaining user data for customizing search functionality or email campaigns targeted to the end users, obtaining user data for personalizing content of the content pages 312, obtaining user data for integration with social networking functionality, obtaining user data for big data analysis, combinations of the same, among other features. Data collected by the tags 316 can be provided to tag vendor systems 370, which can perform any of this vendor-specific processing and provide processed and/or raw collected data to the operator of the content site 312. The raw collected data may instead be passed to the tag vendor systems 370 through the tag management system 350. In another embodiment, the tag vendor systems 370 can provide raw and/or processed data to the tag management system 350, which in turn provides the raw and/or processed data to the operator of the content site 312.

Various marketing user systems 304 can access the tag management system 350. Like the end user systems 302, the marketing user systems 304 can include a browser 305 or other application software that can access network applications over the network 308. The marketing user systems 304 can also be any type of computing device including, but not limited to, a desktop, laptop, tablet, smartphone, or the like. The marketing user systems 304 can be operated by marketing users such as marketing professionals, website operators, business users, operators of the content site 310, or any other individual who uses tags or data obtained from tags. Marketing users are not the end users of the content site 310 in certain embodiments.

A marketing user might use a marketing user system 304 to access the tag management system 350 to create and manage personalization tags or other digital marketing tags. In addition, the marketing users may use the tag management system 350 to request flicker avoidance on personalization tags (or other tags). For instance, the third-party tag manager 352 can output a user interface that enables a user to request flicker-free operation with respect to a selected asynchronous tag 324. In response to a user request for flicker-free operation, the flicker avoidance module 354 can create or access a synchronous script and provide the synchronous script as a synchronous tag 324 to one or more of the tag servers 320. In addition, the flicker avoidance module 354 or the third-party tag manager 352 can output instructions to the marketing user on how to incorporate the synchronous tag container 314 that references this synchronous tag 324 in the content page(s) 312. The marketing user may then edit the content page(s) 312 or instruct another user to edit the content page(s) 312 to include the synchronous tag container 314, which as described above, can call the synchronous tag 324 created by the flicker avoidance module 354.

In other embodiments, the functionality of the flicker avoidance module 354 and/or the third-party tag manager 352 may also be implemented in whole or in part by a TMS plug-in 308 installed within a browser 305 of the marketing user systems 304. In an embodiment (see FIGS. 8 and 9 below), the TMS plug-in 308 can provide a "what you see is what you get" (WYSIWYG) user interface in some embodiments that enables users to select page elements to test or personalize and apply flicker avoidance. The TMS plug-in 308 can generate the synchronous tags 324 or provide information to the tag management system 350 to enable the flicker avoidance module 354 to do so.

In some embodiments, the flicker avoidance functionality may be implemented without implementing a tag management system 350. Instead, the tag vendor or operator of one of the tag vendor systems 370 can provide the synchronous tag 324 and/or the asynchronous tag 322 to the content pages for inclusion in the content pages 312 directly. Thus, the use of tag containers 314, 316 is optional as well. A downside to directly including the tags 322, 324 in the content page 312 is that it may be more complex to manage multiple vendors' tags—especially if multiple personalization vendors each provide synchronous tags in the content page(s) 312, which can slow down performance.

Alternatively, in another embodiment, just the synchronous tag container 314 may be replaced directly with the synchronous tag 324 within the content page 312. The content page 312 may therefore include the synchronous tag 324 and the asynchronous tag container 316. End user systems 302 may therefore obtain the synchronous tag 324 directly from the content site 310, thereby reducing reliance of the content site 310 on the tag server 320 network for the synchronous (and therefore page blocking) tag 324.

Further, the functionality of the flicker avoidance module 354 (or equivalent functionality in the TMS plugin 308) can also be implemented independent of any tag management functionality in some embodiments. Thus, the tag management system 350 (or at least the third party tag manager 352) may be omitted in certain embodiments.

V. Example Flicker Avoidance Processes

Figure 4:
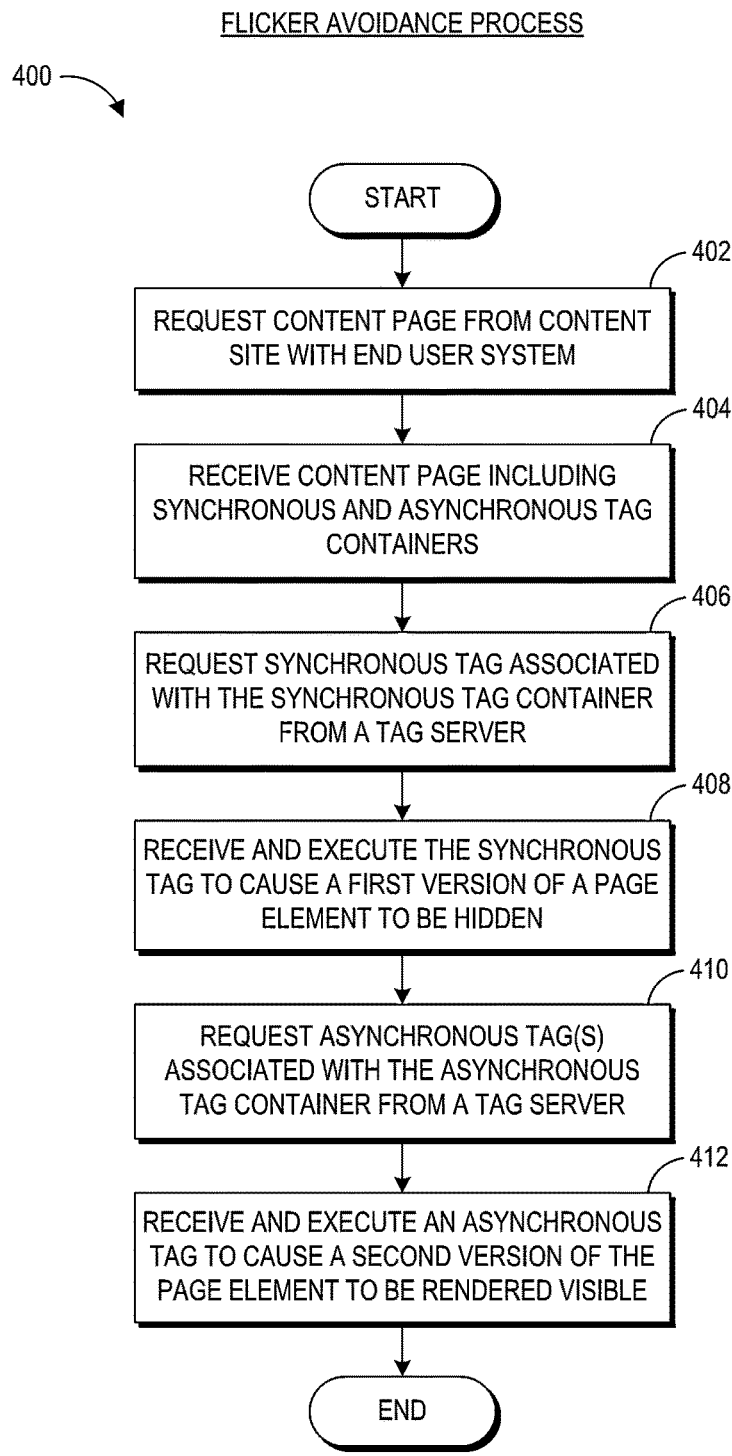
FIG. 4 depicts an embodiment of a flicker avoidance process.

Turning to FIG. 4, an embodiment of a flicker avoidance process 400 is shown. For convenience, the flicker avoidance process 400 is described as being implemented by components of the computing environment 300 described above with respect to FIG. 3. However, the flicker avoidance process 400 is not limited as such and may be implemented by any other system described herein or components thereof, or other computing devices or systems comprising physical computer hardware and/or software. In the depicted embodiment, the flicker avoidance process 400 can hide a page element and replace the page element with another page element that is then later made visible so as to reduce flicker.

At block 402, an end user system 302 requests a content page 312 from the content site 310. At block 404, the browser 303 of the end user system 302 receives the content page 312, which in this embodiment includes synchronous and asynchronous tag containers 314 and 316. At block 406, the browser 303 requests the synchronous tag 324 associated with the synchronous tag container 314 from the tag server 320. The browser 303 may request the synchronous tag before the asynchronous tag because the synchronous tag container 314 may be the first script or at least an earlier script in the content page 312 than the asynchronous tag container 316.

The end user system 302 receives and executes the synchronous tag 324 at block 408, causing a first version of the page element in the content page 312 to be hidden. In one embodiment, the synchronous tag 324 includes one or more operations or directives within the synchronous tag 324 itself that causes the hiding of the page element, rather than with a mere blocking of page loading by the synchronous tag 324 causing the hiding of the page element. The synchronous tag 324 may include a script or the like, such as JavaScript, which can modify the document object model (DOM) of the content page 312 to cause one or more page elements to be hidden. Code examples for the synchronous tag container 314 and tag 324 are described below with respect to FIGS. 10 and 11.

At block 410, the browser 303 of the end user system 302 requests an asynchronous tag associated with the asynchronous tag container 316 from the tag server 320. At block 412, the end user system 302 receives and executes the asynchronous tag 322 to cause a second version of the page element to be rendered visible. In an embodiment, the asynchronous tag 322 includes a script or other operation or directive that explicitly renders the page element visible. In another embodiment, the asynchronous tag 322 includes a directive that calls a function in the synchronous tag 324 that makes the page element visible. Moreover, in other embodiments, the asynchronous tag 322 can call another script apart from the synchronous tag 324 or asynchronous tag 322 that may render the page element visible.

Figure 5:
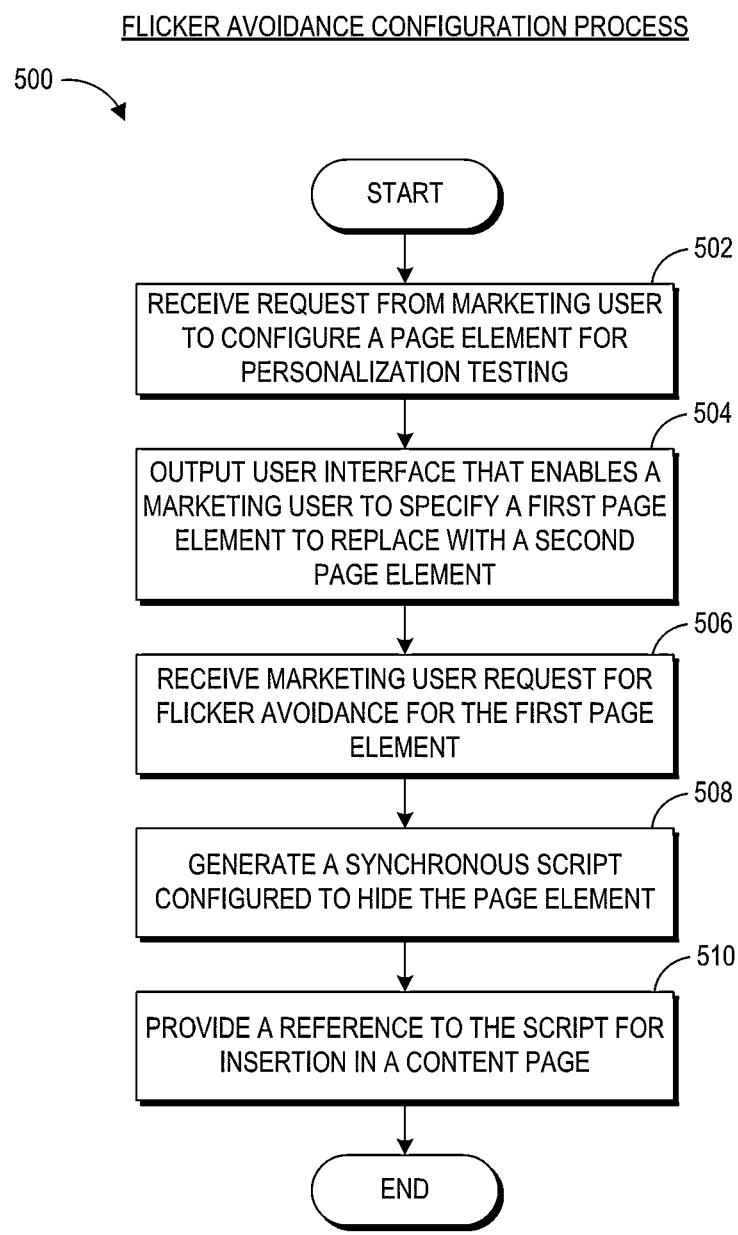
FIG. 5 depicts an embodiment of a flicker avoidance configuration process.

Turning to FIG. 5, an embodiment of the flicker avoidance configuration process 500 is shown. For convenience, the flicker avoidance configuration process 500 is described as being implemented by components of the computing environment 300 described above with respect to FIG. 3. However, the flicker avoidance configuration process 500 is not limited as such and may be implemented by any other system described herein or components thereof, or other computing devices or systems comprising physical computer hardware and/or software.

At block 502 of the process 500, a request is received from a marketing user to configure a page element for personalization testing. The request may be received via a user interface output by the tag management system 350 or by the TMS plug-in 308. Example user interfaces that may be output by the tag management system 350 are described below with respect to FIGS. 6 and 7, while example user interfaces associated with the TMS plug-in 308 are described below with respect to FIGS. 8 and 9.

At block 504, the process outputs a user interface and enables a marketing user to specify a first page element to replace with a second page element. For example, the user interface output by either the tag management system 350 or the TMS plug-in 308 can enable a user to provide a textual description of a page element by specifying an HTML tag's class or ID or by specifying Adobe™ Test and Target™ mbox values of HTML tags surrounding the page element. The mbox values may be included with Adobe's™ Test and Target™ personalization tag and can be used in special mbox HTML tags to wrap around page elements to allow them to be identified for testing or replacement. Thus, if the user identifies the page elements surrounded by mbox tags, the system may know which page elements to replace with other page elements to hide and/or to show at a later time. The user may provide the description of the page element's class, ID, or mbox value (or the like) as a textual description (see, e.g., FIG. 7) or with a WYSIWYG interface (see FIGS. 8 and 9).

At block 506, a marketing user request is received for flicker avoidance for the first page element. The user interfaces provided by the TMS 350 and/or the TMS plug-in 308 can provide check boxes or other user interface controls that enable a user to select flicker avoidance or a flicker-free presentation associated with the personalization of the first page element.

At block 508, a synchronous script is generated by the flicker avoidance module 354 or the TMS plug-in 308. The synchronous script can hide the page element and, as described above, may be uploaded to one of the tag servers 320. The synchronous script may include content that is based on the provided textual description or which is obtained from the WYSIWYG editor described above (see also FIGS. 8 and 9). For instance, the synchronous script can reference particular HTML tag classes, IDs, or mbox values to render tag page elements associated with those values hidden.

At block 510, a reference to the script is provided for insertion in the content page. The reference may include code for a synchronous tag container 314 which can be inserted into the content page 312. Alternatively, the synchronous script itself may be provided at block 510 for insertion into the content page instead of a synchronous tag container.

VI. Example Personalization User Interfaces for Flicker Avoidance

FIGS. 6 through 9 depict example user interfaces that can be output by the tag management system 350 or the TMS plugin 308. Each of the user interfaces shown includes one or more user interface controls that can be selected by a marketing user, for example, using a browser (e.g., the browser 303) or other application software. The user interface controls shown are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, or keyboard input, among other user interface input options.

Figure 6:
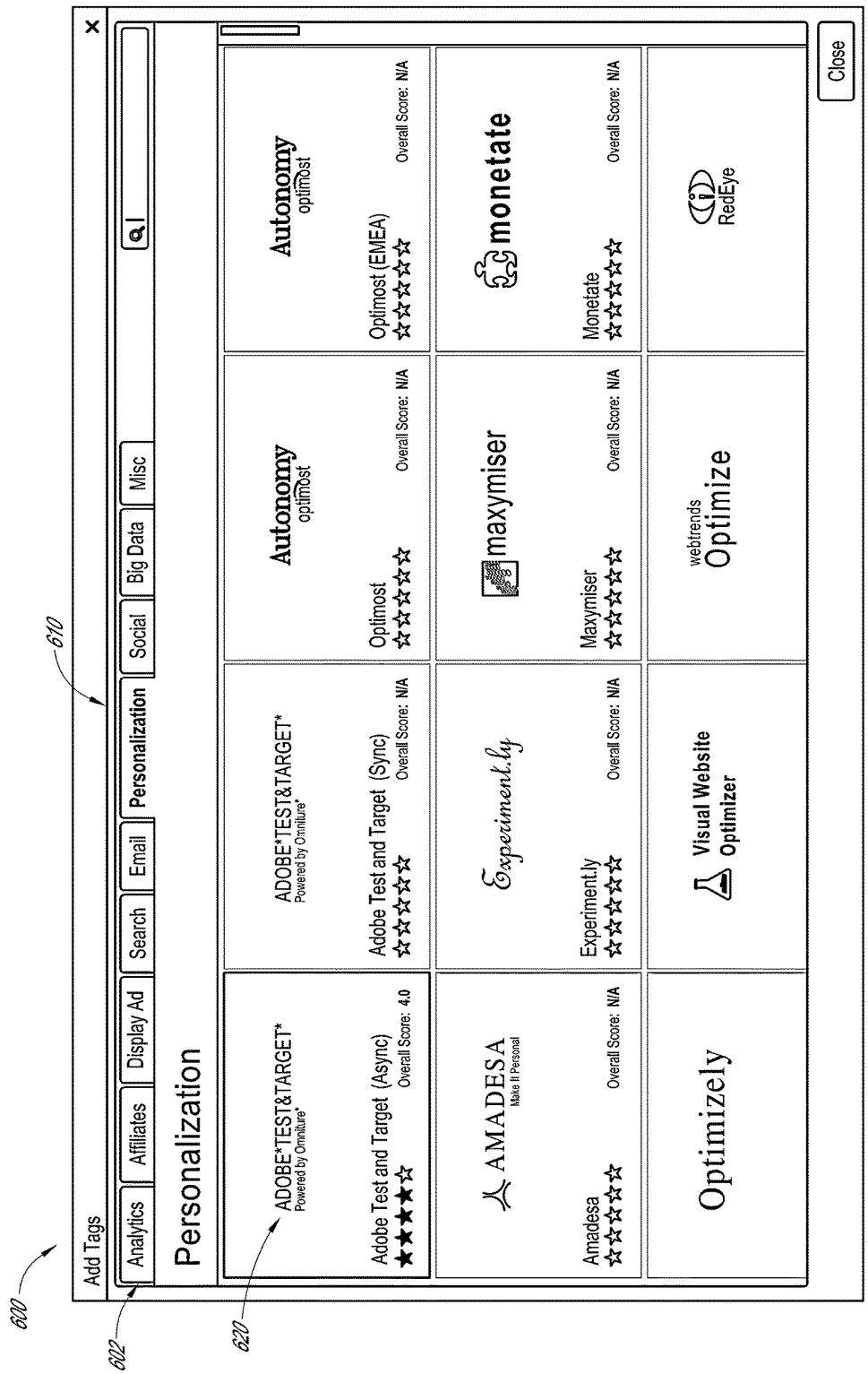
FIGS. 6 through 9 depict example user interfaces that provide functionality for customizing personalization tags to avoid flicker.

Turning to FIG. 6, an example user interface 600 is shown that may be output by the third-party tag manager 352 of the tag management system 350 or by the TMS plug-in 308. The user interface 600 enables a user to select a tag from a plurality of different tag vendors and different types of tags. For instance, in the depicted embodiment, tabs 602 with different types of tags are provided that allow the user to select an digital marketing tag, an affiliates tag, display ad tag, search, email, personalization, social, data tags, miscellaneous tags, or the like. In the depicted embodiment, the personalization tab 610 is selected, and various personalization tags are shown, including a tag 620, which is currently selected by the user. The user can select any of the tags from the different vendors shown to configure parameters of those tags to be used with the tag management system 350 so that those tags can be uploaded to tag servers 320 and referenced by either synchronous tag containers or asynchronous tag containers.

Figure 7:
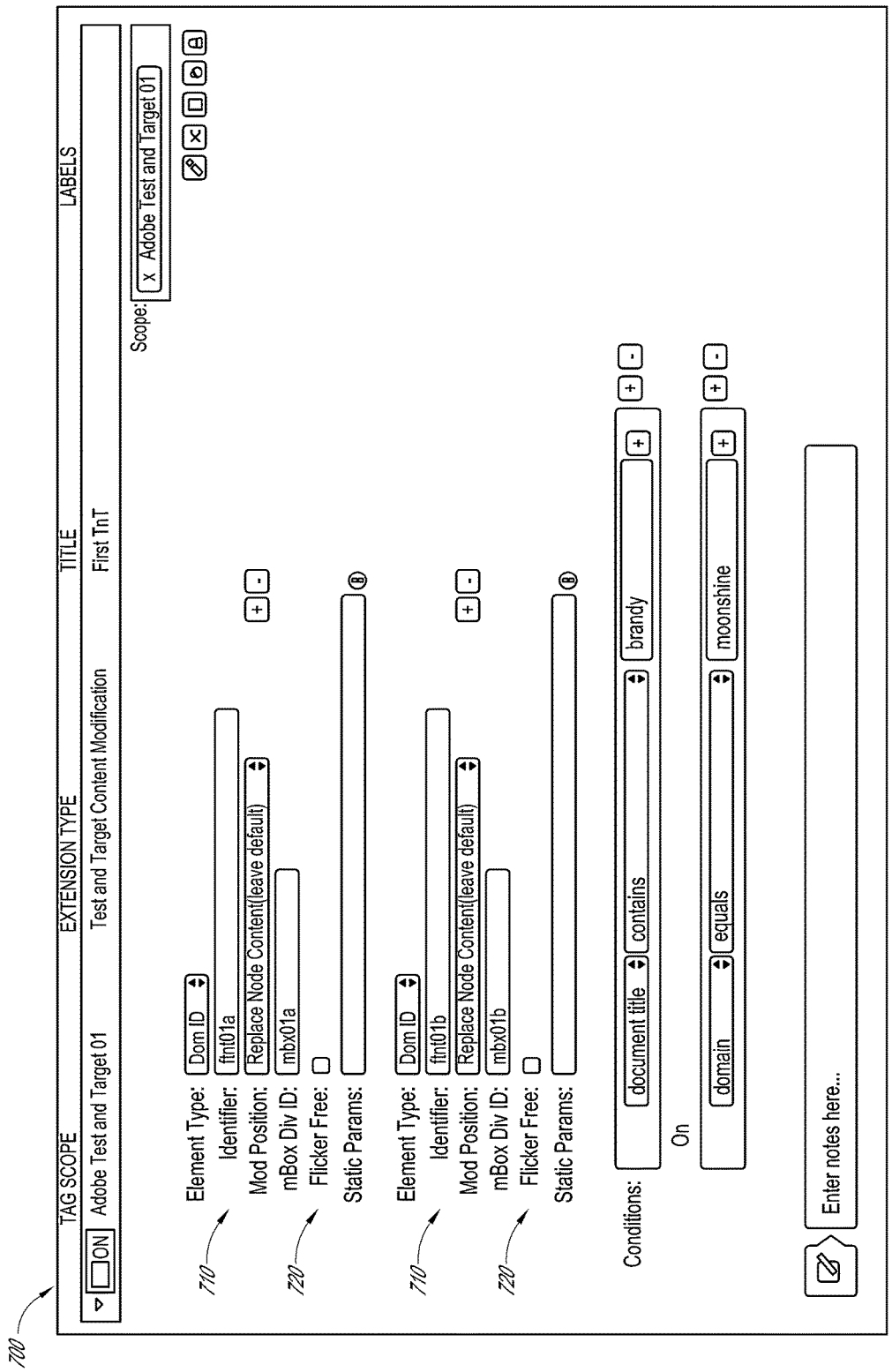

Turning to FIG. 7, an example user interface 700 is shown that enables a user to configure parameters of a personalization tag, such as the Adobe™ Test and Target tag. This user interface 700 may be output by the third-party tag manager 352 and includes user interface controls 710 for editing page element parameters. In the depicted example, these page element parameters include the type of element, its HTML ID, its (optional) mbox identifier, and the like. In addition, flicker avoidance options 720 are provided that enable a user to select whether to apply a flicker-free feature to the HTML tag(s). Selection of the flicker-free box 720 can cause the flicker avoidance module 354 or the TMS plug-in 308 to generate the synchronous tags 324 and/or synchronous tag container 314 described above.

Figure 8:
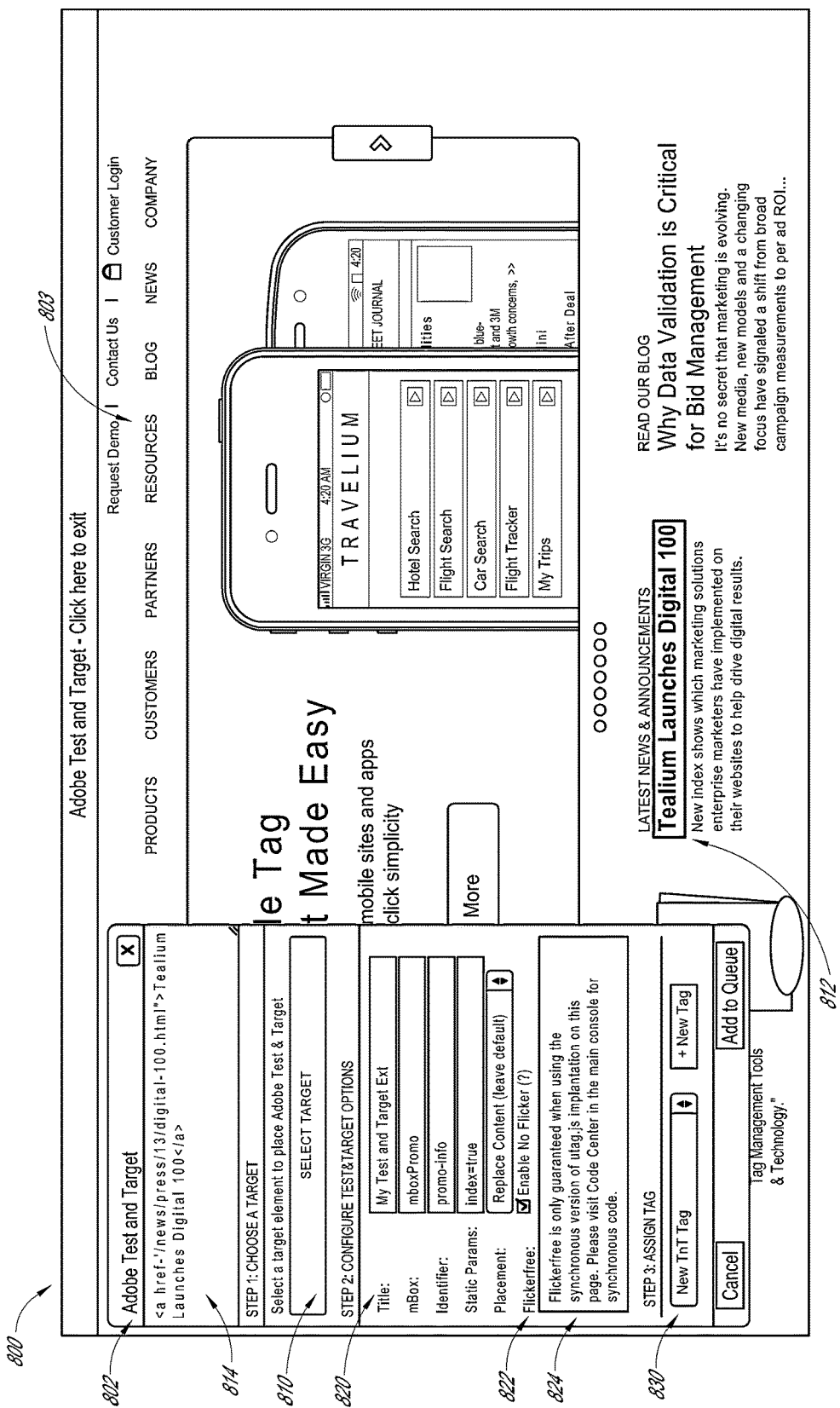

Turning to FIG. 8, a user interface 800 is shown that may be output by the TMS plug-in 308. A plug-in interface 802 is overlaying a browser interface 803. The browser interface 803 shows a web page that can be modified for personalization features by the plug-in user interface 802.

In the depicted embodiment, the TMS plug-in 308 enables the user to click on any page element and specify a tag, such as an Adobe™ Test and Target tag, or other personalization tag, to be created for that page element so that an alternative version of that page element may be displayed for testing purposes or other purposes.

In FIG. 8, an example page element 812 is selected (e.g., by a user), which is a text image that states "Tealium Launches Digital 100." Using the TMS plug-in user interface 802, a marketing user can confirm the selection of the page element 812 as the target page element to modify by selecting a "select target" button 810. Thereafter, the plug-in can automatically obtain an HTML tag 814 associated with the selected target page element 812 by inspecting an ID selector of the page element, class selector of the page element, or by inspecting the document object model (DOM) of the content page. Adobe™ Test and Target™ options 820 are shown for configuring mbox parameters and other HTML tag element identifiers associated with the selected target page element 812. Input in these fields may be auto-populated by the TMS plug-in 308 or manually input by the user so as to identify this page element for subsequent replacement with another page element.

In addition, a flicker-free user interface control 822 is provided that enables a user to select a flicker avoidance option. User selection of this control 822 can result in the TMS plug-in 308 or flicker avoidance module 354 generating a synchronous tag and/or synchronous tag container programmatically, as described above. A text box 824 is also shown that advises the user how to obtain the generated synchronous tag container code to place in the content page. The text box 824 may be output in response to the user selecting the flicker free user interface control 822. User interface controls 830 are also provided for completing creation of the tag.

Figure 9:
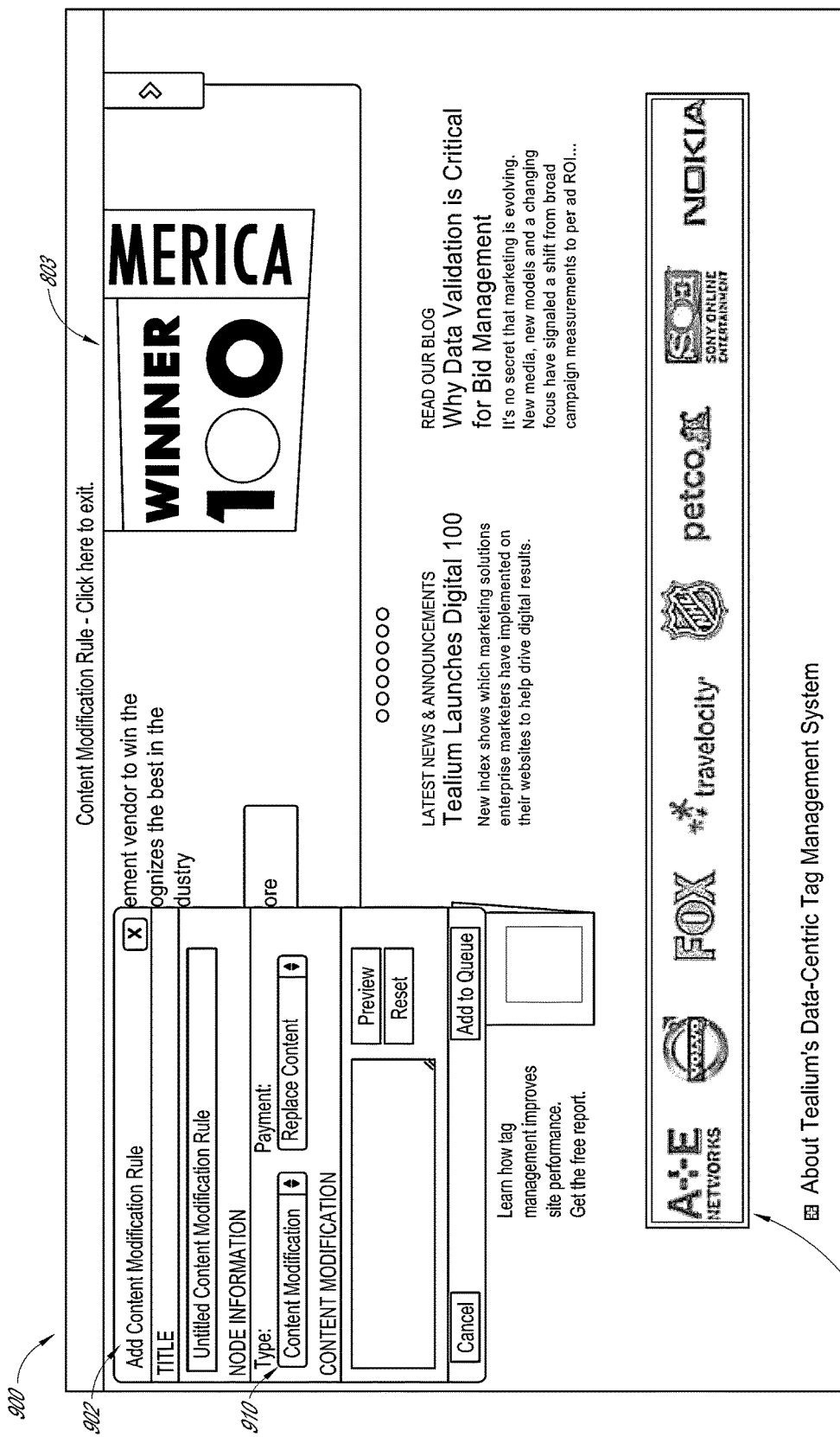

Turning to FIG. 9, another example TMS plug-in user interface 900 is shown that depicts the browser page 803 with another TMS plug-in user interface 902 overlaying the browser page 803. The TMS plug-in user interface 902 may be output to the user in response to the user completing creation of the tag in the TMS plug-in user interface 802 of FIG. 8. In the depicted embodiment, the plug-in user interface 902 includes options 910 for replacing the selected page element 812 in FIG. 8 with a new page element 920, an example of which is shown. In the depicted embodiment, the new page element 920 is an image that may have been selected by the user to replace the text 812 in FIG. 8.

Advantageously, in certain embodiments, because the flicker-free option was selected in FIG. 8, when the content page is loaded on an end-user system, the user should see the page element 920 without first seeing the page element 812.

VII. Example Synchronous/Asynchronous Content Page Examples

Turning to FIG. 10, an embodiment of a content page file 1000 is shown that includes example HTML and JavaScript code for implementing a synchronous tag container and an asynchronous tag container. In particular, synchronous tag container code 1010 is positioned towards the beginning or top of the example content page file 1000 so as to cause page elements coming after the synchronous tag container code 1010 to be hidden. The synchronous tag container code 1010 is shown after an HTML head tag 1011, but could also be placed within the HTML head tag 1011. Further, the synchronous tag container code 1010 may instead be placed lower on the page in some instances, but at possible risk of not hiding page elements that occur before the synchronous tag container code 1010.

Page content 1012 and 1014 is also shown, represented by ellipsis to indicate that the page 1000 may include a variety of content. In addition, an asynchronous tag container code 1020 is shown that can load asynchronously after the synchronous tag container code 1010 is loaded. In an embodiment, because the asynchronous tag container code 1020 comes after the synchronous tag container code 1010 in the page, it will be parsed and executed by the browser after the synchronous tag container code 1010.

As described above, the synchronous tag container code 1010 can call or access a synchronous tag, referred to in the depicted embodiment as "utag.sync.js." This synchronous tag can cause one or more page elements to be hidden. The asynchronous tag container code 1020 can call an asynchronous script, referred to in the depicted embodiment is "utag.js." The asynchronous script can, in turn, invoke one or more asynchronous tags. One of more of these asynchronous tags can update the hidden HTML tags with new data (e.g., a new image, video, and/or text) and cause the hidden elements to be rendered visible. In an embodiment, a first asynchronous tag or tags performs personalization functions to update the hidden HTML element and a second asynchronous tag (or tags) then renders the elements visible.

Turning to FIG. 11, an example synchronous script 1100 is shown that can represent the utag.sync.js script referenced in FIG. 10 by the synchronous tag container. The synchronous script 1100 is an example of the synchronous tag 324, which may be called by the synchronous tag container code 1010 of FIG. 10. The synchronous script 1100 can edit the DOM of a content page by creating a style or style sheet in the HTML head element (or optionally after the head element in other embodiments). This style sheet may be rendered before other HTML elements on the page so that subsequent elements specified in the script can be hidden. The style sheet created by the synchronous script 1100 may be a cascading style sheet (CSS) or the like.

In the depicted embodiment, the synchronous script 1100 applies a "visibility:hidden" CSS property to certain page elements. The "visibility:hidden" property is an example of a property that can hide elements in the page without removing them from the layout of the page. Thus, for example, this property can cause the black t-shirt image of FIG. 2A to be hidden while retaining the square image 222 in the layout of the content page 220 in FIG. 2B. In other embodiments, the synchronous script 1100 could instead use the "display:none" CSS property or its equivalent to remove the element from the display layout entirely. Further, in still other embodiments, the synchronous script 1100 can delete the content of a page element (e.g., content between open/close tags and/or the HTML code within angle brackets "< >") with a JavaScript command. For example, the synchronous script 1100 may use the element.innerHTML function of a JavaScript application programming interface (API)) to delete or replace the content of the page element with blank text or a blank image to render that element invisible. In another embodiment, the synchronous script 1100 can instead overlay the element with a white element or an element with the same color as the background of the page that hides the element.

In the depicted embodiment, the "visibility:hidden" property is applied by operation 1110 to page elements having IDs specified by an array 1120, including "blackDiv," "blueDiv," "pinkDiv," "redDiv," and so on. Thus, the following HTML element would be rendered invisible: <div ID=blackDiv> . . . </div>. These HTML element IDs may have been specified by a marketing user using any of the user interfaces described above. The "visibility:hidden" property may be applied to these page elements when a loop 1130 is executed on those IDs.

In various embodiments, the synchronous tag scripts described herein can apply the "visibility:hidden" property to a class selector instead of an ID selector, or in combination with an ID selector.

Referring again to FIG. 10, an asynchronous tag referenced by the asynchronous tag code 1020 can update the hidden page element by accessing the element.innerHTML function of a JavaScript API (or the like) to modify the content of the page element. The asynchronous tag can then set the visibility property of the page element to "visibility: visible" so as to show the new content in the page element. Thus, the asynchronous tag can modify the style sheet created by the synchronous tag 1100 to update this visibility property. Alternatively, as described above, the asynchronous tag can call a function in the synchronous tag 1100 that sets the visibility property to visible.

VIII. Detailed Example Computing Environment

Figure 12:
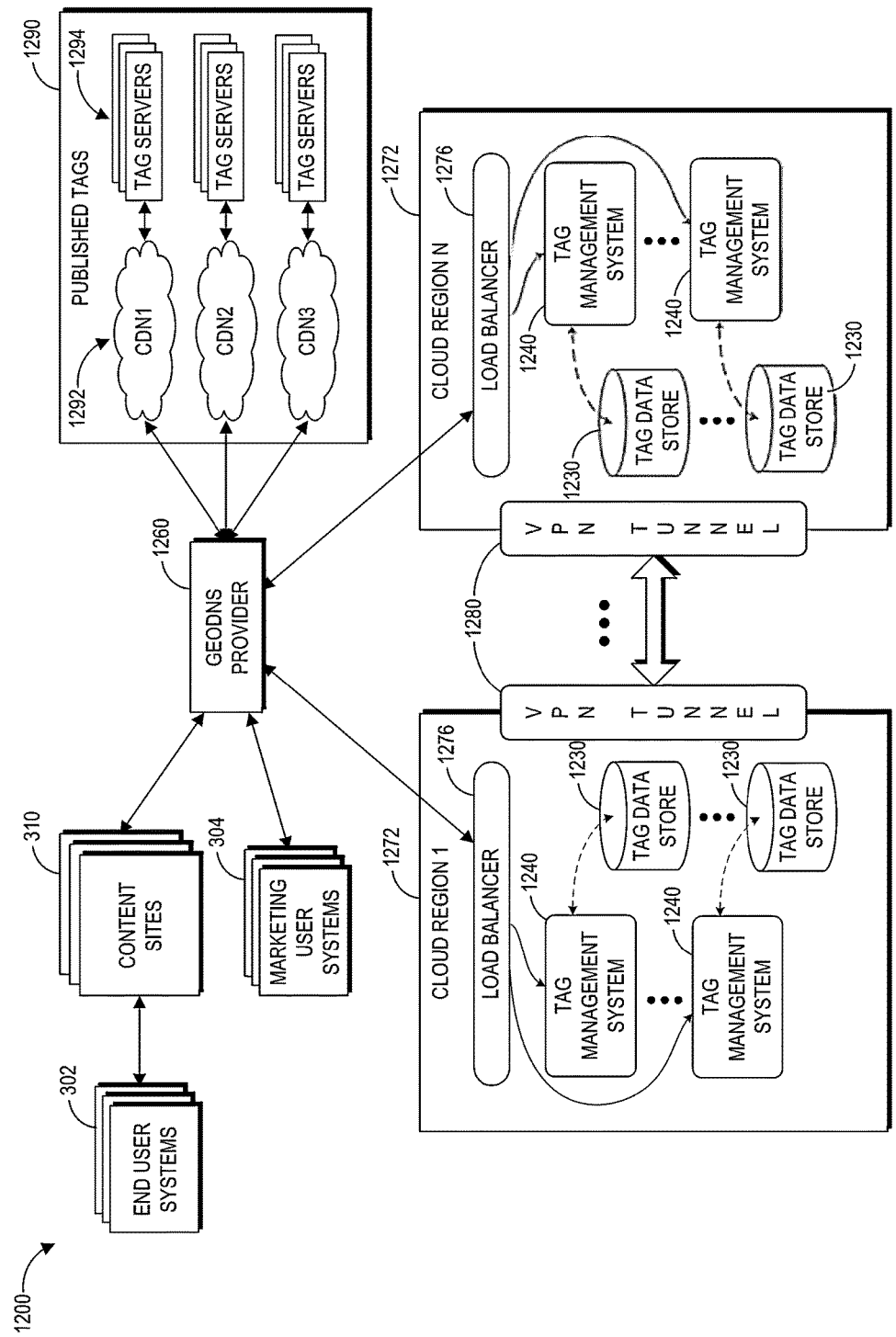
FIG. 12 depicts another embodiment of a computing environment, which provides distributed cloud-based access to a tag management system.

Turning to FIG. 12, a more detailed example embodiment of a computing environment 1200 is shown that can perform any of the tag management features described herein, including flicker avoidance. The computing environment 1200 is a more detailed example of implementation of the computing environment 300 of FIG. 3. As in FIG. 3, end user systems 302 are shown in communication with content sites 310 which may communicate over a network (not shown). In addition, marketing user systems 304 are also shown. The computing environment 1200 facilitates implementation of a tag management system 1240, which may include the functionality of the flicker avoidance module 354 described above. Alternatively, or in addition, the functionality of the flicker avoidance module 354 may be implemented by the TMS plugin 308 installed in the marketing user systems 304 (see FIG. 3).

In the depicted embodiment, the tag management system 1240 is shown distributed in a cloud platform that provides redundant and geographically dispersed access to the tag management system 1240. In particular, the tag management system 1240 is implemented in various cloud regions 1272. These cloud regions may be implemented in any type of cloud platform, which may simply be a data center operated by a vendor of the tag management system or by a third party vendor such as Amazon Web Services™, Microsoft Azure™, Rackspace™ Linode™, combinations of the same, or the like. Each cloud region 1272 includes a load balancer 1276 that can balance requests to tag management system instances 1240.

The tag management system instances 1240 can be implemented as virtual machines and/or physical machines. In the Amazon Web Services embodiment, the instances 1240 can be elastic compute cloud (EC2) instances that are distributed geographically for faster and redundant access to geographically dispersed analysis user systems 104. In addition, visitor profile data storage devices 1230 are shown in the different cloud regions 1272 and can store tag and visitor data in the cloud. Virtual private network (VPN) tunnels 1280 facilitate secure communication in a virtual private network among the different cloud regions 1272 and enable administrator users (not shown) of the tag management system to access tag management system instances 1240.

In an embodiment, the virtual private network is facilitated or provided by a private cloud service, such as the Virtual Private Cloud (VPC) service provided by Amazon Web Services™. The private cloud service can provide security to the tag management system instances 1240 by virtue of obscuring IP addresses of the tag management instances 1240. The tag management system instances 1240 may have nonpublic IP addresses so that each tag management system instance 1240 does not need to have security software that is responsible for securing the tag management system 1240 itself.

A geodns provider 1260 is provided for interfacing between content sites 110, analysis user systems 104, and the various tag management system instances 1240. The geodns provider 1260 also provides access to published tags 1290 which are stored in tag servers 1294 accessible through one or more or content delivery networks (CDNs) 1292. The function of the geodns provider 1260 in one embodiment is to periodically determine which CDN hosting the tags has the lowest latency, thereby selecting which CDN to point the content site 110 to when accessing tags on the tag servers 1294. The geodns provider 1260 may implement the DYN DNS system in one embodiment.

Advantageously, in certain embodiments, by storing tags in CDNs, tag access can be much faster than if tags were stored in locally hosted tag servers. Further, by using a geodns provider 1260, access to tags can be even more rapidly achieved by cycling through the fastest available CDNs 1292.

IX. Additional Embodiments

Although described primarily with respect to flicker avoidance, the combined synchronous-asynchronous tag loading features may have other applications. The synchronous tag may, for instance, perform features instead of or in addition to hiding HTML elements. The synchronous tag (or tag container) may modify page elements to inject content such as a high priority message or service outage message, such as "checkout page unavailable," or the like. The synchronous tag (or tag container) may also perform a redirect action to automatically log in a user to a site (e.g., based on detecting a user's cookie).

Further, in other embodiments, the synchronous-asynchronous features described herein can be used to track page loading or tag loading metrics. For instance, the synchronous tag can include a timer function that begins timing when the synchronous tag is loaded, and the asynchronous tag can include a corresponding function that stops the timer. The asynchronous tag can stop the timer once the DOM of the content page has been loaded completely (e.g., as indicated by a DOM ready routine or handler) or substantially completely in an embodiment. The asynchronous tag (or synchronous tag) can compare the output of the two timer functions to determine an approximate page load time of the page. Alternatively, the asynchronous tag can call a timer function in the synchronous tag to perform similar functionality. The asynchronous tag (or synchronous tag) can supply the page load information to the provider of the content site to enable the content site provider to evaluate the loading performance of the content page.

Similarly, the synchronous tag and/or asynchronous tag can include one or more internal timers that time how long one or more tags take to load. These timer(s) can time, for instance, how long the synchronous tag takes to load, how long the asynchronous tag takes to load, how long any tag called by the asynchronous (or synchronous) tag takes to load, how long any subset of these tags (including all the tags) take to load, and so forth. The synchronous or asynchronous tag can provide these timing metrics to the tag management system 350, which can in turn present this information to a marketing user.

Described above are many embodiments in which a first version of a page element is hidden by a synchronous tag followed by a second version of the page element being made visible by an asynchronous tag. In other embodiments, the first version and the second version of the page element are the same, or in other words, a single page element is first hidden and then rendered visible. One reason for doing so would be if a personalization tag is deployed but a particular user is within a control group that is to be shown the original page element, rather than the replacement page element. The same content page, which may include the synchronous tag and asynchronous tag, may be served to users in the control group as well as to users in a test group. It may be difficult or impractical to modify the content page itself to remove the synchronous tag that hides the element for users in the control group, but easier to modify the asynchronous tag to reshow that element. Accordingly, the asynchronous tag may be modified to show the original page element for the control group while showing a replacement page element in the test group.

Another scenario in which the original page element may be hidden and then shown can occur in some advertising situations. A content site provider may wish to render page elements of the content page first and then render advertising on the page to draw user focus first to the content and then to the advertising. An ad inserted at the top of the page may be drawing users' focus away from the page content, for instance, so the content site provider may wish to render the ad after rendering the page content. The synchronous tag may therefore be employed to hide the advertisement, and the asynchronous tag may show the advertisement after the page has loaded. The asynchronous tag can use a DOM ready routine or handler to determine when the DOM has fully loaded the content page (or substantially loaded the content page), after which the asynchronous tag may show the advertisement.

Further, flicker may be reduced or avoided in some embodiments by replacing content being tested with empty content (e.g., with empty <div> tags on the page). The test content and permanent content can instead be injected using the tag management system. Because the default content is black in this embodiment, flicker can be eliminated.

X. Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of avoiding flicker between versions of a page element of a content page, the method comprising:
   under control of a physical computing device:
      storing, in one or more memory devices, a content page comprising a first tag container, a second tag container, a first version of a first page element, and a second page element, the content page having a body section that includes a first portion and a second portion different from the first portion, the first page element being in the first portion of the body section and the second page element being in the second portion of the body section;
      prior to loading the body section for display in a browser, synchronously executing the first tag container so that loading of the body section for display in the browser is prevented until execution of the first tag container is completed,
      wherein said synchronously executing the first tag container comprises:
         requesting a first script from a first server via a computer network according to first container instructions of the first tag container,
         receiving the first script via the computer network, and
         executing the first script so that, according to first script instructions of the first script, the first version of the first page element is hidden from display by the browser upon loading of the body section for display in the browser;
      loading the body section for display in the browser so that the second page element is loaded and presented as visible by the browser and, according to the first script instructions, the first version of the first page element is loaded and hidden from display by the browser; and
      asynchronously executing the second tag container comprising:
         requesting a second script from a second server via the computer network according to second container instructions of the second tag container,
         receiving the second script via the computer network, and
         executing the second script so that, according to second script instructions of the second script, a second version of the first page element is loaded and presented as visible by the browser in place of the first version of the first page element that was loaded and hidden from display by the browser.

2. The method of claim 1, wherein said executing the first script and said executing the second script are together configured to prevent page element flickering when rendering the first version of the first page element and the second version of the first page element.

3. The method of claim 1, wherein said executing the first script comprises modifying a Document Object Model (DOM) of the content page to assign a hidden visibility attribute to the first version of the first page element.

4. The method of claim 1, wherein the first page element comprises at least one of an image, a video, or a text.

5. The method of claim 1, wherein the first tag container is placed before the second tag container in the content page so that the first tag container is executed before the second tag container.

6. The method of claim 5, wherein the first tag container is placed within an HTML head tag.

7. The method of claim 1, wherein said executing the second script comprises assigning a reveal visibility attribute to the second version of the first page element.

8. The method of claim 1, wherein said executing the first script comprises executing the first script so that, according to the first script instructions, the first version of the first page element is hidden from display by the browser without removing the first version of the first page element from a layout of the content page.

9. The method of claim 1, wherein said executing the first script comprises executing the first script so that, according to the first script instructions, the first version of the first page element is hidden from display by the browser by removing the first version of the first page element from a layout of the content page.

10. The method of claim 1, wherein said executing the first script comprises executing the first script so that, according to the first script instructions, the first version of the first page element is hidden from display by the browser by deleting the first version of the first page element from the content page.

11. The method of claim 1, wherein said executing the first script comprises executing the first script so that, according to the first script instructions, the first version of the first page element is hidden from display by the browser by overlaying the first version of the first page element with another element upon loading of the body section for display in the browser.

12. The method of claim 1, wherein said executing the second script comprises calling a function of the first script so that the second version of the first page element is presented as visible by the browser.

13. The method of claim 1, wherein the second script is part of at least a first digital tag and a second digital tag, the second digital tag being separate from the first digital tag, wherein said executing the second script comprises:
   executing the first digital tag so that, according to first tag instructions of the first digital tag, the second version of the first page element is loaded; and executing the second digital tag so that, according to second tag instructions of the second digital tag, the second version of the first page element is presented as visible by the browser.

14. The method of claim 1, wherein said asynchronously executing the second tag container comprises:
    requesting a third script from a third server via the computer network according to the second container instructions,
    receiving the third script via the computer network, and
    executing the third script so that, according to third script instructions of the third script, data indicative of user interactions with the content page is gathered and transmitted via the computer network.

15. The method of claim 1, wherein the first server is the same as the second server.

16. The method of claim 1, wherein the first version of the first page element is the same as the second version of the first page element.

17. The method of claim 1, wherein the first version of the first page element is identified by an opening HTML tag of the content page and a closing HTML tag of the content page.

18. A system for avoiding flicker between versions of a page element of a content page, the system comprising:
    one or more memory devices configured to store a content page comprising a first tag container, a second tag container, a first version of a first page element, and a second page element, the content page having a body section that includes a first portion and a second portion different from the first portion, the first page element being in the first portion of the body section and the second page element being in the second portion of the body section; and
    one or more hardware processors in communication with the one or more memory devices, the one or more hardware processors being configured to:
        prior to loading the body section for display in a browser, synchronously execute the first tag container so that loading of the body section for display in the browser is prevented until execution of the first tag container is completed,
        wherein synchronous execution of the first tag container by the one or more hardware processors causes the one or more hardware processors to:
            request a first script from a first server via a computer network according to first container instructions of the first tag container,
            receive the first script via the computer network, and
            execute the first script so that, according to first script instructions of the first script, the first version of the first page element is hidden from display by the browser upon loading of the body section for display in the browser;
        load the body section for display in the browser so that the second page element is loaded and presented as visible by the browser and, according to the first script instructions, the first version of the first page element is loaded and hidden from display by the browser; and
        asynchronously execute the second tag container,
        wherein asynchronous execution of the second tag container by the one or more hardware processors causes the one or more hardware processors to:
            request a second script from a second server via the computer network according to second container instructions of the second tag container,
            receive the second script via the computer network, and
            execute the second script so that, according to second script instructions of the second script, a second version of the first page element is loaded and presented as visible by the browser in place of the first version of the first page element that was loaded and hidden from display by the browser.

19. Non-transitory physical computer storage comprising computer-executable instructions stored thereon that, when executed by one or more processors, are configured to implement a process of executing a first tag container and a second tag container of a content page, the content page comprising a first version of a first page element and a second page element, the first page element being positioned in a first portion of a body section of the content page and the second page element being positioned in a second portion of the body section different from the first portion, wherein the process comprises:
    prior to loading the body section for display in a browser, synchronously executing the first tag container so that loading of the body section for display in the browser is prevented until execution of the first tag container is completed,
    wherein said synchronously executing the first tag container comprises:
        requesting a first script from a first server via a computer network according to first container instructions of the first tag container,
        receiving the first script via the computer network, and
        executing the first script so that, according to first script instructions of the first script, the first version of the first page element is hidden from display by the browser upon loading of the body section for display in the browser;
    loading the body section for display in the browser so that the second page element is loaded and presented as visible by the browser and, according to the first script instructions, the first version of the first page element is loaded and hidden from display by the browser; and
    asynchronously executing the second tag container comprising:
        requesting a second script from a second server via the computer network according to second container instructions of the second tag container,
        receiving the second script via the computer network, and
        executing the second script so that, according to second script instructions of the second script, a second version of the first page element is loaded and presented as visible by the browser in place of the first version of the first page element that was loaded and hidden from display by the browser.

20. The non-transitory physical computer storage of claim 19, wherein said executing the first script and said executing the second script are together configured to prevent page element flickering when rendering the first version of the first page element and the second version of the first page element.

21. The non-transitory physical computer storage of claim 19, wherein said synchronously executing the first script comprises modifying a Document Object Model (DOM) of the content page to assign a hidden visibility attribute to the first version of the first page element.

22. The non-transitory physical computer storage of claim 19, wherein the first page element comprises at least one of an image, a video, or text.

23. The non-transitory physical computer storage of claim 19, wherein the first tag container is placed before the second tag container in the content page so that the first tag container is executed before the second tag container.

* * * * *